(12) United States Patent
Ouyang

(10) Patent No.: US 11,797,141 B2
(45) Date of Patent: Oct. 24, 2023

(54) TOUCH SENSOR MEMBER PRECURSOR, AND METHOD FOR MANUFACTURING TOUCH SENSOR MEMBER

(71) Applicant: FUJIFILM Corporation, Tokyo (JP)

(72) Inventor: Tianhua Ouyang, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 78 days.

(21) Appl. No.: 17/720,981

(22) Filed: Apr. 14, 2022

(65) Prior Publication Data

US 2022/0253181 A1 Aug. 11, 2022

Related U.S. Application Data

(63) Continuation of application No. PCT/JP2020/038609, filed on Oct. 13, 2020.

(30) Foreign Application Priority Data

Oct. 18, 2019 (JP) .................................. 2019-191377

(51) Int. Cl.
*G06F 3/044* (2006.01)

(52) U.S. Cl.
CPC .. *G06F 3/0446* (2019.05); *G06F 2203/04103* (2013.01); *G06F 2203/04112* (2013.01)

(58) Field of Classification Search
None
See application file for complete search history.

(56) References Cited

U.S. PATENT DOCUMENTS

| 6,522,378 B1 | 2/2003 | Mizuno et al. |
| 2014/0175049 A1* | 6/2014 | Mohapatra ............ G06F 3/0446 156/60 |
| 2014/0362306 A1 | 12/2014 | Chen et al. |

(Continued)

FOREIGN PATENT DOCUMENTS

| JP | 11-271790 A | 10/1999 |
| JP | 2012-155514 A | 8/2012 |

(Continued)

OTHER PUBLICATIONS

International Search Report issued in PCT/JP2020/038609 dated Dec. 15, 2020.

(Continued)

*Primary Examiner* — Christopher J Kohlman
(74) *Attorney, Agent, or Firm* — Edwards Neils LLC; Jean C. Edwards, Esq.

(57) ABSTRACT

A touch sensor member precursor includes touch sensor pattern portions, lead wires led out from the touch sensor pattern portions, connection terminals connected to the lead wires, connection wirings connected to the connection terminals, and a potential difference elimination pattern portion connected to the connection wirings. The touch sensor pattern portions, the lead wires, the connection terminals, the connection wirings, and the potential difference elimination pattern portion are disposed on the same surface of a substrate, each of the connection wirings has a connection wiring width Wd, the connection terminals adjacent to each other are spaced from each other by a distance Sc between closest terminals at positions closest to each other, and a relationship of Wd<Sc is satisfied.

20 Claims, 13 Drawing Sheets

(56) References Cited

U.S. PATENT DOCUMENTS

| | | | |
|---|---|---|---|
| 2015/0234271 A1* | 8/2015 | Tokunaga | G06F 3/04164 430/14 |
| 2018/0246592 A1 | 8/2018 | Savich et al. | |
| 2019/0129543 A1 | 5/2019 | Watanabe | |

FOREIGN PATENT DOCUMENTS

| | | |
|---|---|---|
| JP | 2018-001654 A | 1/2018 |
| JP | 2018-528512 A | 9/2018 |
| JP | 2019-079414 A | 5/2019 |

OTHER PUBLICATIONS

Written Opinion issued in PCT/JP2020/038609 dated Dec. 15, 2020.

International Preliminary Report on Patentability completed by WIPO dated Apr. 19, 2022 in connection with International Patent Application No. PCT/JP2020/038609.

Office Action, issued by the Japanese Patent Office dated Jan. 4, 2023 in connection with Japanese Patent Application No. 2021-552391.

\* cited by examiner

TOUCH SENSOR MEMBER PRECURSOR, AND METHOD FOR MANUFACTURING TOUCH SENSOR MEMBER

CROSS-REFERENCE TO RELATED APPLICATIONS

This application is a Continuation of PCT International Application No. PCT/JP2020/038609 filed on Oct. 13, 2020, which was published under PCT Article 21(2) in Japanese, and which claims priority under 35 U.S.C. § 119(a) to Japanese Patent Application No. 2019-191377 filed on Oct. 18, 2019. The above applications are hereby expressly incorporated by reference, in their entirety, into the present application.

BACKGROUND OF THE INVENTION

1. Field of the Invention

The present invention relates to a touch sensor member precursor including a plurality of touch sensor pattern portions consisting of conductive member and a method for manufacturing a touch sensor member.

2. Description of the Related Art

Touch panels that perform input operations to electronic apparatuses by a touch to a screen are now used in combination with display devices such as liquid crystal display devices in various electronic devices including mobile information devices such as tablet-type computers and smartphones. The touch panels include touch sensor members in which a plurality of touch sensor pattern portions corresponding to detection electrodes for detecting a touch and a plurality of lead wires electrically connected to the plurality of touch sensor pattern portions are disposed on a transparent substrate.

In a step of manufacturing such a touch sensor member, a potential difference of several kV is generated between adjacent touch sensor pattern portions and between lead wires 22 adjacent to each other, and discharge occurs. As a result, the touch sensor pattern portions and the lead wires may be damaged. In particular, a touch sensor member having a film-shaped substrate is often manufactured by a so-called roll-to-roll method. In a step of winding the touch sensor member, discharge occurs due to the touch different sensor pattern portions and the different lead wires, which approach each other in a thickness direction of the touch sensor member, and as a result, the touch sensor pattern portions and the lead wires may be damaged.

Therefore, in order to prevent damage to the touch sensor pattern portions and the lead wires due to discharge, for example, a precursor of the touch sensor member as disclosed in JP2012-155514A has been developed. The precursor of the touch sensor member in JP2012-155514A includes a short-circuit pattern for short-circuiting the plurality of lead wires. Thereby, the occurrence of potential difference between the plurality of lead wires and between the plurality of touch sensor pattern portions in the step of manufacturing a touch sensor member is suppressed.

In JP2012-155514A, in the step of manufacturing a touch sensor member, the short-circuit pattern is cut from the plurality of lead wires in order to electrically separate the plurality of touch sensor pattern portions, in this case, fragments of the plurality of lead wires are generated and scattered, and for example, the lead wires adjacent to each other are short-circuited, so that a so-called short-circuit failure may occur. As described above, there is a problem in JP2012-155514A that it is difficult to suppress discharge between different touch sensor pattern portions and between different lead wires and suppress the short-circuit failure at the same time.

An object of the present invention is to provide a touch sensor member precursor capable of solving the above-mentioned problem based on the related art and suppressing a discharge phenomenon and a short-circuit failure at the same time, and a method for manufacturing a touch sensor member.

SUMMARY OF THE INVENTION

In order to achieve the above object, a touch sensor member precursor according to an aspect of the present invention comprises a substrate, a plurality of touch sensor pattern portions disposed on at least one surface of the substrate, a plurality of lead wires led out from the plurality of touch sensor pattern portions, a plurality of connection terminals connected to the plurality of lead wires, a plurality of connection wirings connected to the plurality of connection terminals, and at least one potential difference elimination pattern portion connected to the plurality of connection wirings, in which the plurality of touch sensor pattern portions, the plurality of lead wires, the plurality of connection terminals, the plurality of connection wirings, and the potential difference elimination pattern portion consist of conductive members disposed on the same surface of the substrate, each of the plurality of connection wirings includes a cut portion having a connection wiring width Wd, the connection terminals adjacent to each other among the plurality of connection terminals are spaced from each other by a distance Sc between closest terminals at positions closest to each other, and a relationship of Wd<Sc is satisfied.

The distance Sc between closest terminals of the plurality of connection terminals is preferably 150 µm or greater and 250 µm or smaller.

In this case, the connection wiring width Wd of the cut portion of each of the plurality of connection wirings preferably satisfies a relationship of 3 µm≤Wd<250 µm, and more preferably satisfies a relationship of 3 µm≤Wd<150 µm.

The lead wires adjacent to each other among the plurality of lead wires are preferably spaced from each other by a distance Sb between closest lead wires at positions closest to each other, and a relationship of Wd<Sb<Sc is preferably satisfied.

The distance Sb between closest lead wires of the plurality of lead wires is preferably 10 µm or greater and 60 µm or smaller.

In this case, the connection wiring width Wd of the cut portion of each of the plurality of connection wirings preferably satisfies a relationship of 3 µm≤Wd<60 µm, and more preferably satisfies a relationship of 3 µm≤Wd<10 µm.

The potential difference elimination pattern portion can cause an electrical short-circuit between the plurality of connection wirings.

Here, a plurality of pattern formation areas are formed on at least one surface of the substrate, and the plurality of touch sensor pattern portions, the plurality of lead wires, the plurality of connection terminals, and the plurality of connection wirings can be disposed on each of the pattern formation areas.

In this case, the potential difference elimination pattern portion can cause an electrical short-circuit between the plurality of connection wirings disposed in the plurality of pattern formation areas different from each other among the plurality of pattern formation areas.

Alternatively, the potential difference elimination pattern portion can consist of a plurality of sacrifice pattern portions that are connected to the plurality of connection wirings, and are disposed to be electrically separated from each other, in which a distance Sg between closest sacrifice pattern portions at positions closest to each other satisfies a relationship of 0<Sg<Sb with respect to the distance Sb between closest lead wires.

In addition, the plurality of touch sensor pattern portions, the plurality of lead wires, the plurality of connection terminals, the plurality of connection wirings, and the potential difference elimination pattern portions can be disposed on both surfaces of the substrate.

Furthermore, each of the conductive members preferably includes a metal material, and more preferably contains silver as the metal material.

A method for manufacturing a touch sensor member according to an aspect of the present invention comprises cutting the cut portion of each of the plurality of connection wirings of the above-mentioned touch sensor member precursor.

According to the touch sensor member precursor according to the aspect of the present invention, since each of the plurality of connection wirings includes a cut portion having a connection wiring width Wd, the connection terminals adjacent to each other among the plurality of connection terminals are spaced from each other by the distance Sc between closest terminals at positions closest to each other, and the relationship of Wd<Sc is satisfied, a discharge phenomenon and a short-circuit failure can be suppressed at the same time.

DESCRIPTION OF THE PREFERRED EMBODIMENTS

Hereinafter, a touch sensor member precursor and a method for manufacturing a touch sensor member of an embodiment of the present invention will be described in detail based on suitable embodiments illustrated in accompanying drawings.

The figures described below are exemplary for explaining the present invention, and the present invention is not limited to the figures illustrated below.

In the following, the term "to" indicating the numerical value range includes the numerical values described on both sides. For example, the term "ε is the numerical value α to the numerical value β" means that the range of a includes the numerical value α and the numerical value β, and in a case of being indicated by mathematical signs, $\alpha \leq \varepsilon \leq \beta$.

Angles such as the terms "parallel" and "orthogonal" include error ranges generally tolerated in the art, unless otherwise described.

In addition, the term "the same" includes error ranges generally tolerated in the art, unless otherwise described.

The term "light" means actinic rays or radiation. Unless otherwise specified, the term "exposure" as used in the present specification includes not only exposure to a bright line spectrum of mercury lamp, far ultraviolet rays represented by excimer laser light, X-rays, EUV light, or the like but also exposure to lithography with a particle beam such as an electron beam and an ion beam.

In addition, the term "(meth)acrylate" represents both acrylate and methacrylate, or either, and the term "(meth)acrylic" represents both acrylic and methacrylic, or either. Furthermore, the term "(meth)acryloyl" represents both acryloyl and methacryloyl or either.

Unless otherwise specified, the term "transparency to visible light" means that light transmittance is 40% or more in a visible light wavelength region of 380 to 780 nm, preferably 80% or more, and more preferably 90% or more. In the following description, unless otherwise specified, the term "transparency" means transparency to visible light.

The light transmittance is measured by using "Plastics Determination of Total Luminous Transmittance and Reflectance" specified in JIS (Japanese Industrial Standards) K 7375:2008.

In addition, the term "electrically conductive" means a state in which a current flows. For example, in a case where two conductive members are electrically connected to each other, the two conductive members are electrically conductive.

The term "electrically non-conductive" means a state in which no current flows. For example, in a case where the two conductive members are not in a state of contacting with each other, these two conductive members are in an electrically insulating state and are electrically non-conductive.

(Touch Sensor Member Precursor)

Figure 1:
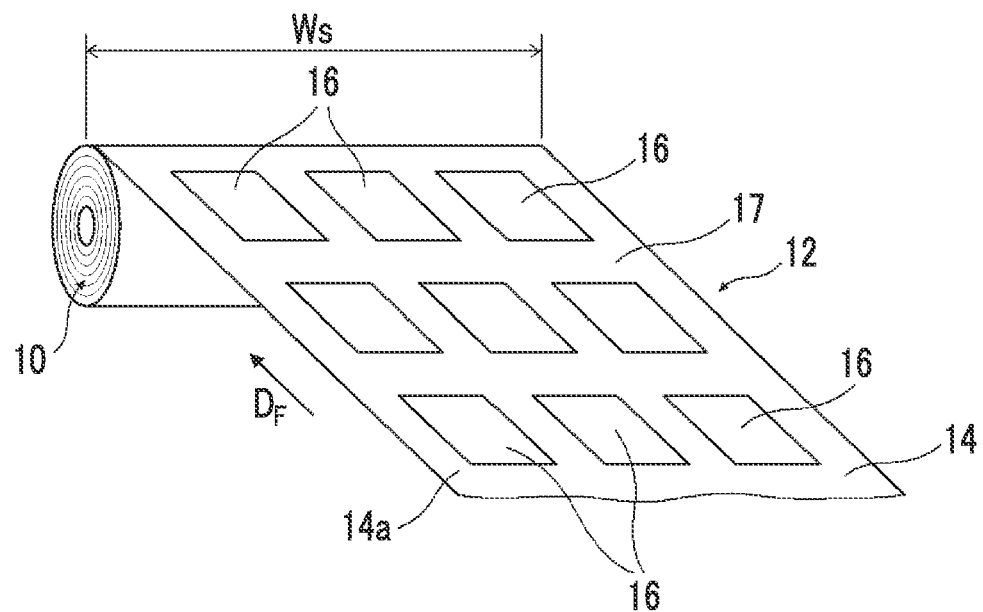
FIG. 1 is a schematic perspective view illustrating an example of a winding roll around which a touch sensor member precursor according to an embodiment of the present invention is wound.
Figure 2:
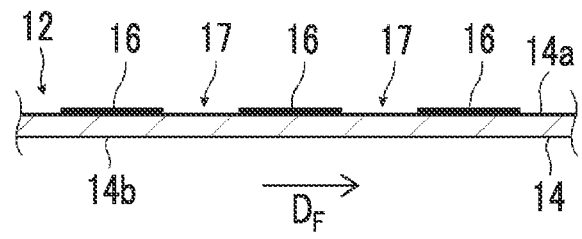
FIG. 2 is a schematic cross-sectional view illustrating the touch sensor member precursor according to the embodiment of the present invention.

FIG. 1 is a schematic perspective view illustrating an example of a winding roll 10 around which at least one touch sensor member precursor 12 according to an embodiment of the present invention is wound, and FIG. 2 is a schematic cross-sectional view illustrating the touch sensor member precursor 12 according to the embodiment of the present invention.

The touch sensor member precursor 12 is a precursor of a touch sensor member (not illustrated) used as a so-called touch sensor, includes a flexible substrate 14, and has a plurality, of pattern formation areas 16 on at least one surface of the substrate 14. Here, the term "flexible" means bendable, and specifically, the term. "flexible" means that cracks do not occur even though the bending is carried out with a curvature radius of 1 mm.

The winding roll 10 illustrated in FIG. 1 is a roll around which the touch sensor member precursor 12 is wound into a cylindrical shape in a step of manufacturing a touch sensor member. The touch sensor member precursor 12 is wound around the winding roll 10 while the touch sensor member precursor 12 is transported in a transport direction $D_F$. As illustrated in FIGS. 1 and 2, the touch sensor member precursor 12 has, for example, the plurality of pattern formation areas 16 on a front surface 14a of the substrate 14. The plurality of pattern formation areas 16 are provided on the substrate 14 of the touch sensor member precursor 12 in the transport direction $D_F$ with gap portions 17 interposed between the plurality of pattern formation areas 16, and the plurality of pattern formation areas 16 are provided even in a direction orthogonal to the transport direction $D_F$. The plurality of pattern formation areas 16 are all congruent. The gap portion 17 is a region between one pattern formation area 16 and another pattern formation area 16 in the transport direction $D_F$ of the touch sensor member precursor 12. The substrate 14 has a width Ws in a direction orthogonal to the transport direction $D_F$, and this width Ws is a width of the winding roll 10.

As illustrated in FIG. 1, by providing the plurality of pattern formation areas 16 on the substrate 14, a plurality of the touch sensor member precursors 12 can be collectively obtained, and production efficiency is improved.

The structure of the gap portions 17 is not particularly limited as long as the pattern formation areas 16 are not formed. Various patterns such as an alignment mark or a pattern for adjusting a thickness in order to assist the transfer of the substrate 14 may be formed in the gap portions 17. The gap portions 17 may be the substrate 14 itself on which nothing is formed.

Although not illustrated, the plurality of pattern formation areas 16 may be formed on both surfaces of the substrate 14, that is, both the front surface 14a and a back surface 14b of the substrate 14.

[Configuration of Touch Sensor Member Precursor]

Figure 3:
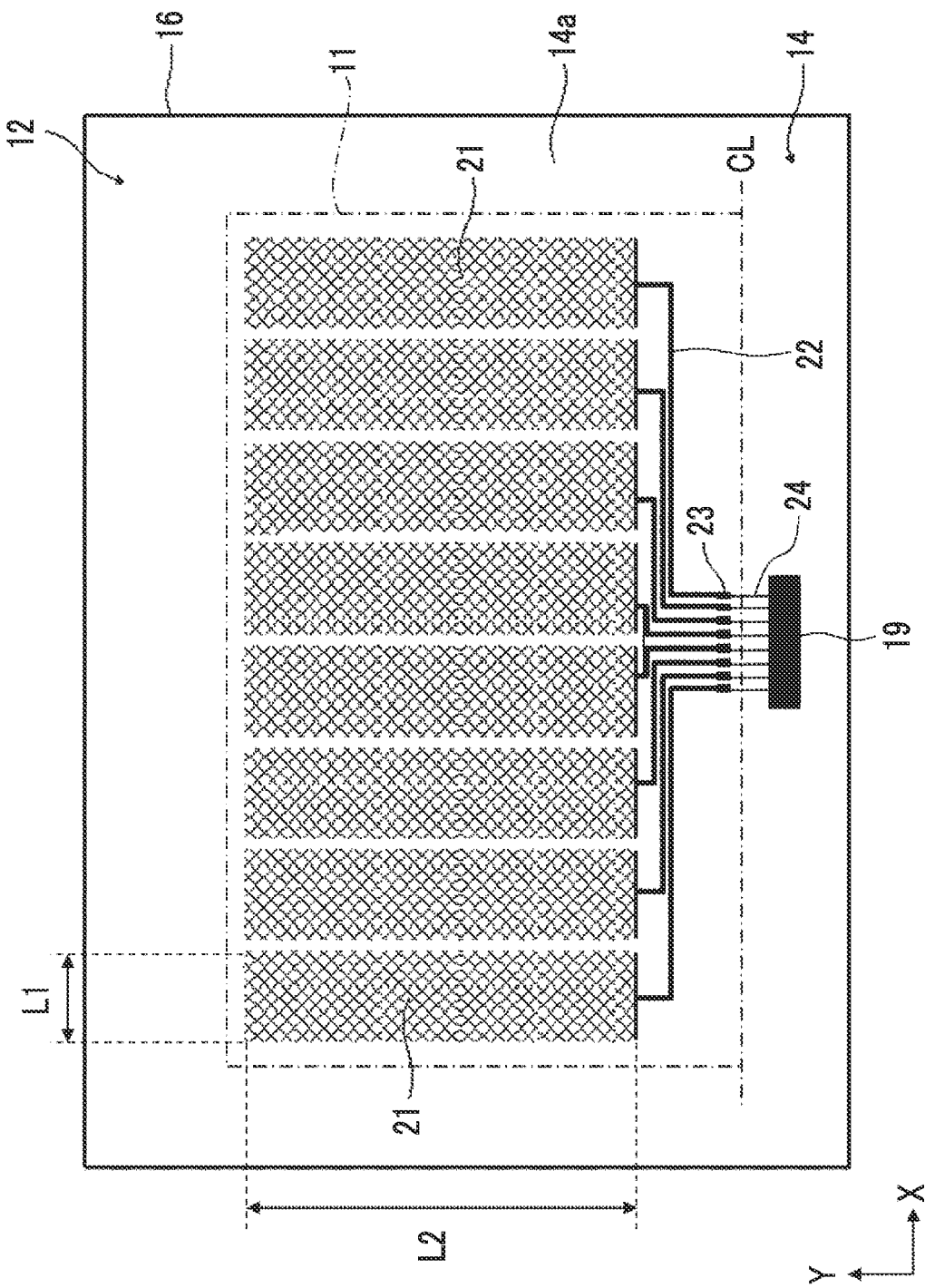
FIG. 3 is a schematic view illustrating an example of the touch sensor member precursor according to the embodiment of the present invention.

FIG. 3 is a schematic view illustrating an example of the touch sensor member precursor 12 according to the embodiment of the present invention.

The touch sensor member precursor 12 includes the substrate 14, a plurality of touch sensor pattern portions 21 disposed on at least one surface of the substrate 14, a plurality of lead wires 22 led out from the plurality of touch sensor pattern portions 21, a plurality of connection terminals 23 connected to the plurality of lead wires 22, a plurality of connection wirings 24 connected to the plurality of connection terminals 23, and at least one potential difference elimination pattern portion 19 connected to the plurality of connection wirings 24. Each of the plurality of touch sensor pattern portions 21, the plurality of lead wires 22, the plurality of connection terminals 23, the plurality of connection wirings 24, and the potential difference elimination pattern portion 19 consists of a conductive member disposed on the same surface of the substrate 14, and are included in each of the pattern formation areas 16.

As illustrated in FIG. 3, the touch sensor member 11 manufactured based on the touch sensor member precursor 12 includes the substrate 14, the plurality of touch sensor pattern portions 21, the plurality of lead wires 22, the plurality of connection terminals 23, and a part of the plurality of connection wirings 24 in the touch sensor member precursor 12. In the following description, for the sake of explanation, it is assumed that the substrate 14 extends along the XY plane and the plurality of touch sensor pattern portions 21 are arranged along the X direction.

The plurality of touch sensor pattern portions 21 carry out contact detection for detecting a contact or an approach of a user's finger or an object such as a stylus pen, a bending of the plurality of touch sensor pattern portions 21, a pressure applied to the plurality of touch sensor pattern portions 21, and the like, as electric signals. In addition to the contact detection, the plurality of touch sensor pattern portions 21 can also have functions such as signal detection for detecting signals such as electromagnetic waves and noise cutting for blocking electromagnetic waves of a specific frequency coming from the outside.

As illustrated in FIG. 3, for example, each of the plurality of touch sensor pattern portions 21 has a substantially rectangular region having a sensor pattern width L1 in the X direction and a sensor pattern length L2 in the Y direction.

Figure 4:
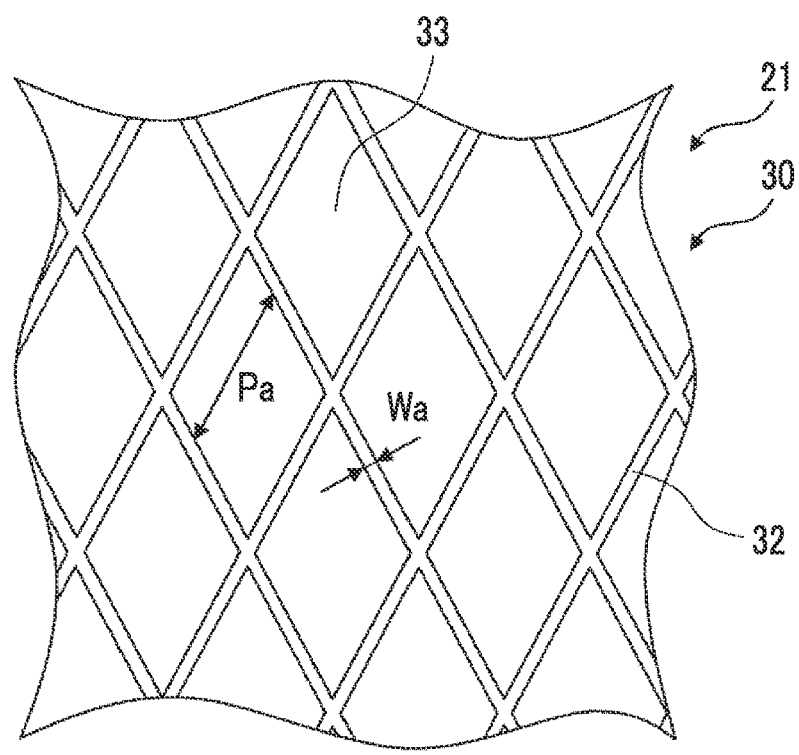
FIG. 4 is a schematic view illustrating an example of a touch sensor pattern portion of the touch sensor member precursor of the embodiment of the present invention.

As illustrated in FIG. 4, for example, each of the plurality of touch sensor pattern portions 21 has a mesh pattern 30 in which a plurality of conductive wires 32; each of which is formed of a conductive member and has a line width Wa, intersect with each other. The line width Wa of each of the conductive wires 32 is not particularly limited, but the upper limit is preferably 10 μm or smaller, more preferably 5 μm or smaller, the lower limit is preferably 0.5 μm or greater, more preferably 1 μm or greater, and even more preferably 3 μm or greater. In a case where the line width Wa is within the above range, the touch sensor pattern portions 21 can have a low resistance.

In the example illustrated in FIG. 4, the mesh pattern 30 has a plurality of diamond-shaped opening portions 33 each of which is an opening region surrounded by the conductive wires 32 and has an opening width Pa. The opening width Pa is defined as a distance between the conductive wires 32 adjacent and parallel to each other. For example, in a case where the plurality of touch sensor pattern portions 21 are disposed on a display surface (not illustrated) of an image display module (not illustrated), for the purpose of causing the plurality of touch sensor pattern portions 21 to be inconspicuous and causing a user who visually recognizes the display surface of the image display module to visually recognize the display on the display surface without discomfort, the upper limit of the opening width Pa of each of the plurality of opening portions 33 is preferably 800 μm or smaller, more preferably 600 μm or smaller, and even more preferably 400 μm or smaller. In addition, the lower limit of the opening width Pa of each of the plurality of opening portions 33 is preferably 5 μm or greater, more preferably 30 μm or greater, and even more preferably 80 μm or greater.

From the viewpoint of ensuring sufficient visible light transmittance in the plurality of touch sensor pattern portions 21, an opening ratio of the mesh pattern 30 is preferably 85% or more, more preferably 90% or more, and even more preferably 95% or more. The opening ratio of the mesh pattern 30 is a transmissive part of an area occupied by the mesh pattern 30 excluding the conductive wires, that is, the opening ratio of the mesh pattern 30 corresponds to a ratio of a total area occupied by the plurality of openings 33 to the entire area of each of the touch sensor pattern portions 21.

The plurality of touch sensor pattern portions 21 are not limited to having the diamond-shaped mesh pattern 30 as long as each of the plurality of touch sensor pattern portions 21 has a mesh-like pattern, and can have, for example, mesh patterns of geometric figures in combinations of triangles such as regular triangles, isosceles triangles, and right-angled triangles, squares such as quadrates, rectangles, parallelograms, trapezoids, (regular) n-sided polygons such as (regular) hexagons and (regular) octagons, circles, ellipses, and star shapes.

Figure 5:
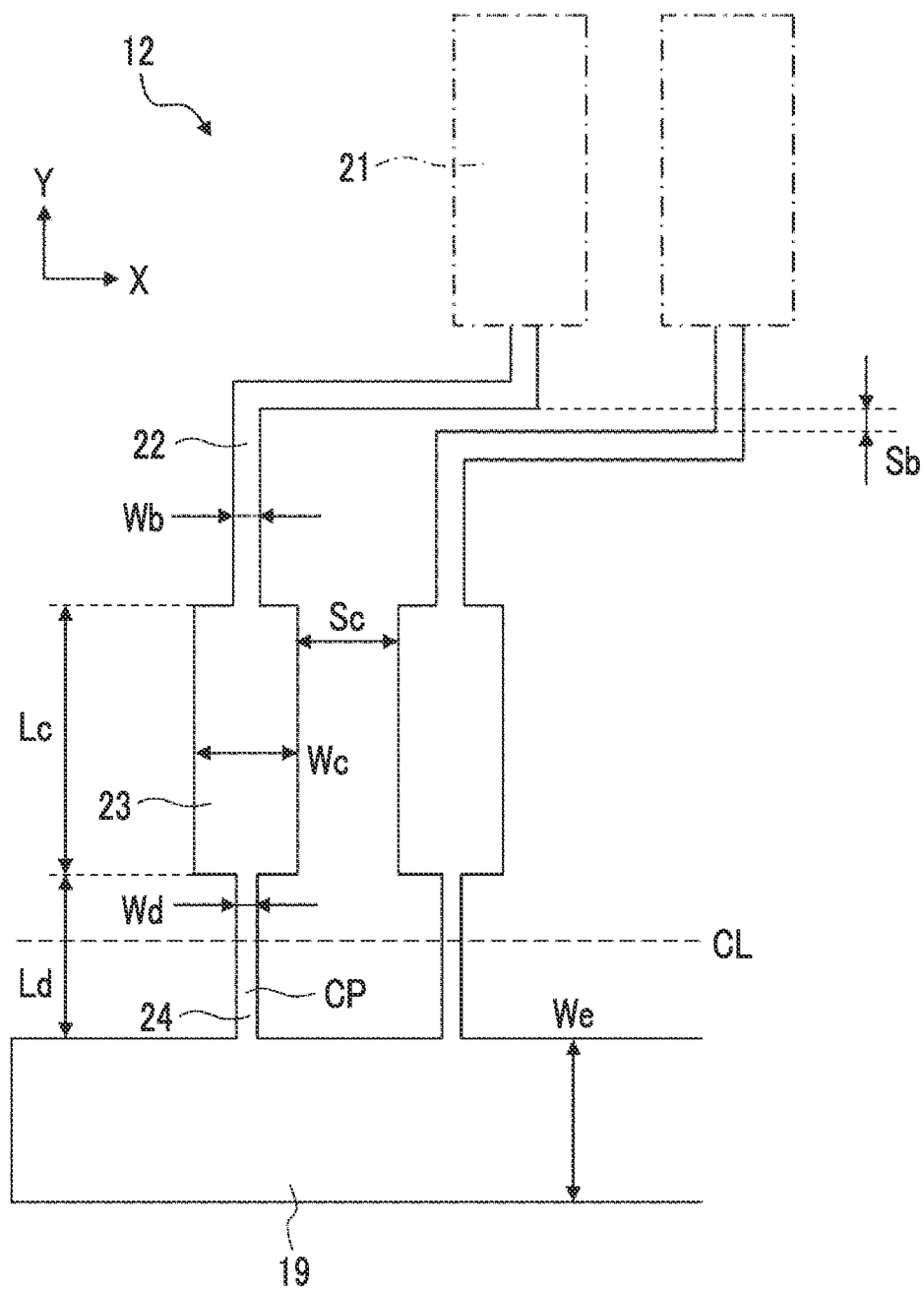
FIG. 5 is a diagram schematically illustrating the touch sensor pattern portion, a lead wire, a connection terminal, a connection wiring, and a potential difference elimination pattern portion of the touch sensor member precursor of the embodiment of the present invention.

As schematically illustrated in FIG. 5, the plurality of lead wires 22 connect the plurality of touch sensor pattern portions 21 and the plurality of connection terminals 23. Each of the plurality of lead wires 22 has a lead wire width Wb of, for example, about 10 μm or greater and 60 μm or smaller, and the lead wires 22 adjacent to each other among the plurality of lead wires 22 are spaced from each other by a distance Sb between closest lead wires at positions closest to each other. In the example illustrated in FIG. 5, two lead wires 22 respectively extend from one side of end portions connected to the touch sensor pattern portions 21 along the Y direction, bend to extend along the X direction in the middle, and furthermore extend along the Y direction in the middle, so that the other side of end portions are connected to the connection terminals 23. As a result, the two lead wires 22 are closest to each other at portions extending along the X direction. Here, from the viewpoint of reducing an area of a region where the plurality of lead wires 22 are wired on the front surface 14a of the substrate 14 and achieving space saving of the touch sensor member 11 manufactured from the touch sensor member precursor 12, the distance Sb between closest lead wires is preferably about 10 μm or greater and 60 μm or smaller.

The plurality of connection terminals 23 are connected to the plurality of touch sensor pattern portions 21 by the plurality of lead wires 22. Although not illustrated, for example, the plurality of connection terminals 23 are electrically connected to a flexible printed circuit (FPC) board or the like to have a function of extracting electric signals from the touch sensor pattern portions 21 to the outside. In the example illustrated in FIG. 5, each of the connection terminals 23 has a rectangular shape having a connection terminal width We in the X direction and a connection terminal length Lc in the Y direction. In this case, it is desirable that each of the plurality of connection terminals 23 has a connection terminal width We of about 100 μm or greater and 250 μm or smaller so that the FPC or the like can be easily connected.

The connection terminals 23 adjacent to each other among the plurality of connection terminals 23 are spaced from each other by a distance Sc between closest terminals at positions closest to each other. In the example illustrated in FIG. 5, since each of the plurality of connection terminals 23 has a rectangular shape having a connection terminal width We in the X direction and a connection terminal length Le in the Y direction, the distance Sc between closest terminals is equal to a distance between the connection terminals 23 adjacent to each other in the X direction. Here, for example, it is preferable that the distance Sc between closest terminals satisfies a relationship of (distance Sb between closest lead wires)<(distance Sc between closest terminals) so that the FPC or the like can be easily connected.

The plurality of connection wirings 24 are wirings that electrically connect the plurality of connection terminals 23 and the potential difference elimination pattern portion 19. As will be described in detail later, each of the plurality of connection wirings 24 has at least one cut portion CP that is cut in a step of manufacturing the touch sensor member 11 from the touch sensor member precursor 12. In the example illustrated in FIG. 5, each of the plurality of connection wirings 24 has a constant connection wiring width Wd in the X direction and extends along the Y direction while having a connection wiring length Ld in the Y direction, and any position of the plurality of connection wirings 24 in the Y direction can also be the cut portion CR The connection wiring width Wd of the cut portion CP of each of the plurality of connection wirings 24 satisfies a relationship of (connection wiring width Wd)<(distance Sc between closest terminals).

The potential difference elimination pattern portion 19 is connected to the plurality of connection wirings 24, and is a pattern for eliminating a potential difference between the plurality of touch sensor pattern portions 21, between the plurality of lead wires 22, between the plurality of connection terminals 23, and between the plurality of connection wirings 24. In the example illustrated in FIG. 5, the potential difference elimination pattern portion 19 is a pattern consisting of a conductive member and having a rectangular shape, and causes a short-circuit between the plurality of connection wirings 24, so that it is possible to suppress the occurrence of potential difference between the plurality of touch sensor pattern portions 21, between the plurality of lead wires 22, between the plurality of connection terminals 23, and between the plurality of connection wirings 24. The potential difference elimination pattern portion 19 has a potential difference elimination pattern portion width We in the Y direction. Although not illustrated, the potential difference elimination pattern portion 19 has a potential difference elimination pattern length Le in the X direction.

As illustrated in FIG. 1, in the step of manufacturing the touch sensor member 11 such as a step of winding the touch sensor member precursor 12 around the winding roll 10, static electricity or the like may be charged to the plurality of touch sensor pattern portions 21, the plurality of lead wires 22, the plurality of connection terminals 23, and the plurality of connection wirings 24. Such charging is a factor that causes the potential difference between the plurality of touch sensor pattern portions 21, between the plurality of lead wires 22, between the plurality of connection terminals 23, and between the plurality of connection wirings 24. In general, in a case where a potential difference occurs between two conductive members adjacent to each other, a discharge is generated between the two conductive members. In particular, in a case where the conductive members are conductive wires each of which has a narrow line width, the discharge causes the conductive wires to be damaged.

In the touch sensor Member precursor 12 according to the embodiment of the present invention, since the potential difference elimination pattern portion 19 is connected to the plurality of connection terminals 23, the plurality of connection terminals 23 are short-circuited. Therefore, the occurrence of potential difference between the plurality of touch sensor pattern portions 21, between the plurality of lead wires 22, between the plurality of connection terminals 23, and between the plurality of connection wirings 24 is suppressed. As a result, it is possible to suppress the damage to the conductive wires 32 constituting the plurality of touch sensor pattern portions 21, the plurality of lead wires 22, and the plurality of connection terminals 23, due to the discharge phenomenon.

(Touch Sensor Member)

As illustrated in FIG. 3, the touch sensor member 11 includes the substrate 14, the plurality of touch sensor pattern portions 21, the plurality of lead wires 22, the plurality of connection terminals 23, and a part of the plurality of connection wirings 24 of the touch sensor member precursor 12, and the plurality of touch sensor pattern portions 21, the plurality of lead wires 22, the plurality of connection terminals 23, and the plurality of connection wirings 24 are electrically separated from each other. The touch sensor member 11 is manufactured by cutting cut portions CP of the plurality of connection wirings 24 in the touch sensor member precursor 12. For example, as illustrated in FIG. 5, by cutting the cut portions CP of the plurality of connection wirings 24 along a cutting line CL extending along the X direction, the potential difference elimination pattern portion 19 is separated from the touch sensor member precursor 12, thereby the touch sensor member 11 being manufactured.

For cutting the cut portions CP of the plurality of connection wirings 24, for example, so-called punching or laser machining can be used.

Here, by cutting the cut portions CP of the plurality of connection wirings 24, fragments of the plurality of connection wirings 24 may be generated, and the generated fragments may be scattered on the substrate 14. It is assumed that the fragments of the plurality of connection wirings 24 scattered in this way cause, for example, a so-called short-circuit failure causing short-circuits between the lead wires 22 adjacent to each other and between the connection terminals 23 adjacent to each other. The cut portions CP of the plurality of connection wirings 24 are cut along, fir example, the cutting line CL extending along the X direction, and it is assumed that a length of each of the fragments of the plurality of connection wirings 24 generated during the cutting of the cut portions CP is a length equal to or shorter than about the connection wiring width Wd of each of the cut portions CP. In the touch sensor member precursor 12 according to the embodiment of the present invention, since the relationship of (connection wiring width Wd)<(distance Sc between closest terminals) is satisfied, fragments each of which has a length equal to or longer than the distance Sc between closest terminals is less likely to be generated in the case where the cut portions CP of the plurality of connection wirings 24 are cut. Therefore, even though the fragments of the plurality of connection wirings 24 are scattered between the connection terminals 23 adjacent to each other, the short-circuit between the connection terminals 23 adjacent to each other is suppressed.

Furthermore, in order to suppress a short-circuit between the lead wires 22 adjacent to each other due to the fragments of the plurality of connection wirings 24, it is more preferable that a relationship of (connection wiring width Wd)<(distance Sb between closest lead wires)<(distance Sc between closest terminals) is satisfied.

As a specific numerical range of the connection wiring width Wd, 3 μm≤(connection wiring width Wd)<250 μm is preferable, 3 μm≤(connection wiring width Wd)<150 nm is more preferable, 3 μm≤(connection wiring width Wd)<60 μm is even more preferable, and 3 μm≤(connection wiring width Wd)<10 μm is most preferable.

As described above, according to the touch sensor member precursor 12 of the embodiment of the present invention and the method for manufacturing the touch sensor member 11 obtained by using the touch sensor member precursor 12, both the discharge phenomenon and the short-circuit failure, which occur between the plurality of lead wires 22 and between the plurality of connection terminals 23, can be suppressed.

Another Example of Touch Sensor Member Precursor

First Modified Example in the example of FIG. 5, the plurality of connection wirings 24 are illustrated, in which each of the plurality of connection wirings 24 has the constant connection wiring width Wd and the entire of each of the plurality of connection wirings 24 in the Y direction can be the cut portion CP, but the connection wirings 24 may have a plurality of different wiring width.

Figure 6:
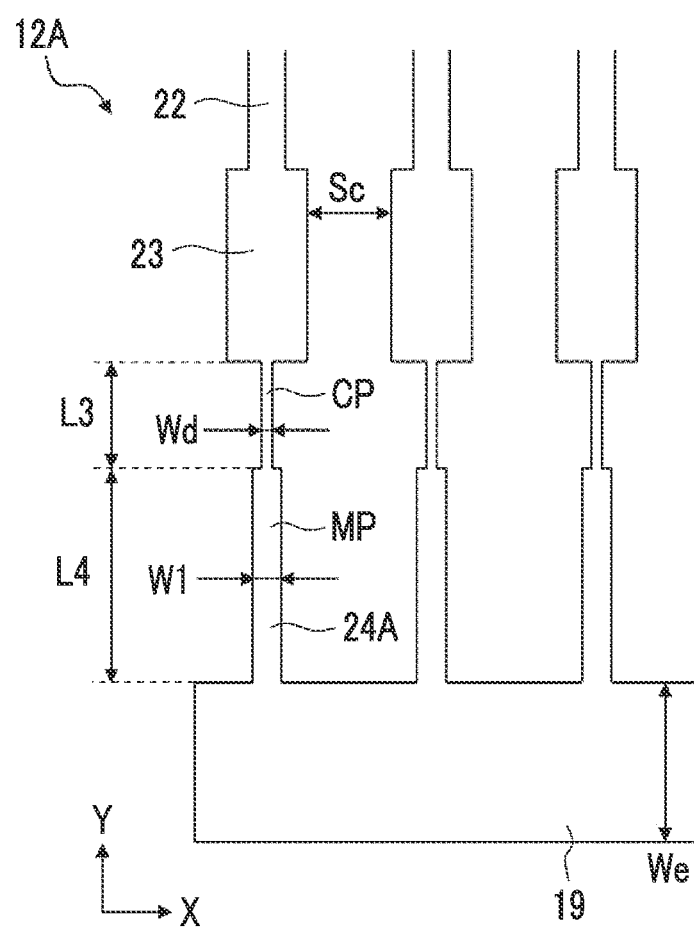
FIG. 6 is a schematic view illustrating a touch sensor member precursor according to a first modified example of the embodiment of the present invention.

FIG. 6 illustrates a touch sensor member precursor 12A according to a first modified example of the embodiment of the present invention. In the touch sensor member precursor 12A, each of a plurality of connection wirings 24A has a connection wiring width Wd in the X direction, a cut portion CP having a cut portion length L3 in the Y direction, and a main portion MP having a line width W1 in the X direction and a main portion length L4 in the Y direction. In FIG. 6, one end of the cut portion. CP and one end of the main portion MP are connected to each other, the other end of the cut portion CP is connected to one connection terminal 23, and the other end of the main portion MP is connected to the potential difference elimination pattern portion 19.

In this way, in each of the plurality of connection wirings 24A, even though only a part of the line width is particularly narrowed, the relationship of (connection wiring width Wd)<(distance Sc between closest terminals) or the relationship of (connection wiring width Wd)<(distance Sb between closest lead wires)<(distance Sc between closest terminals) is satisfied. Therefore, both the discharge phenomenon and short-circuit failure, which occur between the plurality of lead wires 22 and between the plurality of connection terminals 23, can be suppressed.

Second Modified Example

In the examples of FIGS. 1, 5, and 6, the potential difference elimination pattern portion 19 having a rectangular shape is illustrated, but the shape of the potential difference elimination pattern portion 19 is not particularly limited thereto.

Figure 7:
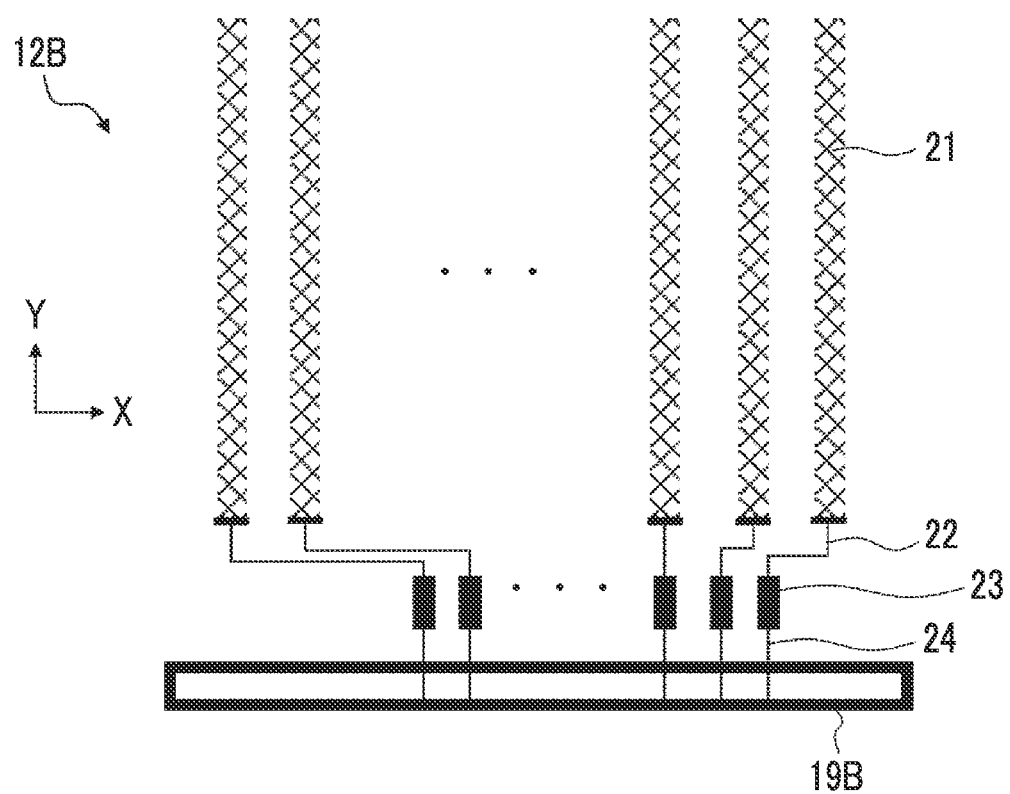
FIG. 7 is a schematic view illustrating a touch sensor member precursor according to a second modified example of the embodiment of the present invention.

FIG. 7 illustrates a touch sensor member precursor 12B according to a second modified example of the embodiment of the present invention. " . . . " in the figure indicates that the plurality of touch sensor pattern portions 21, the plurality of lead wires 22, the plurality of connection terminals 23, and the plurality of connection wirings 24 are repeatedly disposed. A potential difference elimination pattern portion 19B of the touch sensor member precursor 12B has a rectangular frame line shape. Even though the potential difference elimination pattern portion 19B has such a shape, the plurality of connection wirings 24 are short-circuited by the potential difference elimination pattern portion 19B. Therefore, it is possible to suppress the occurrence of potential difference between the plurality of touch sensor pattern portions 21, between the plurality of lead wires 22, between the plurality of connection terminals 23, and between the plurality of connection wirings 24. Although having the rectangular frame line shape, the potential difference elimination pattern portion 19B can also have any closed frame line shape.

Third Modified Example

Figure 8:
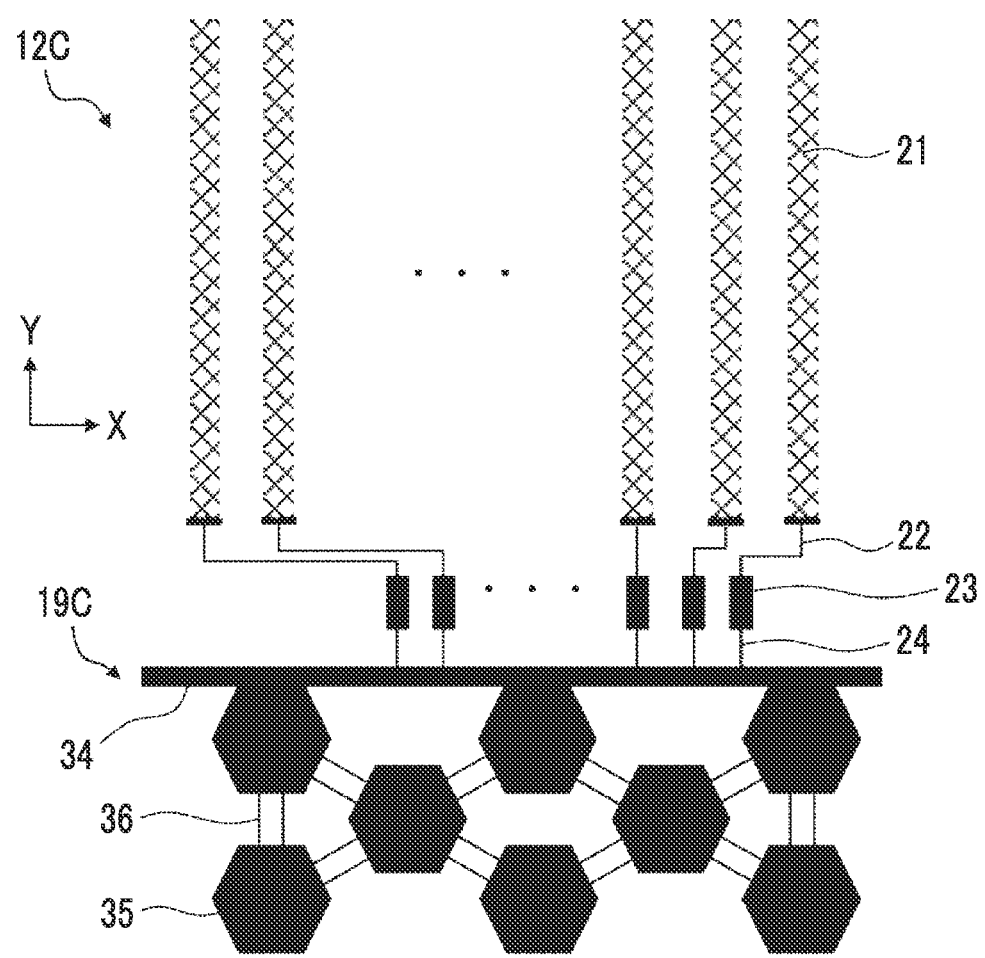
FIG. 8 is a schematic view illustrating a touch sensor member precursor according to a third modified example of the embodiment of the present invention.

FIG. 8 illustrates a touch sensor member precursor 12C according to a third modified example of the embodiment of the present invention. A potential difference elimination pattern portion 19C of the touch sensor member precursor 12C includes a rectangular base 34 extending along the X direction and a plurality of hexagonal-shaped portions 35 having a hexagonal shape. The adjacent hexagonal-shaped portions 35 among the plurality of hexagonal-shaped portions 35 are connected to each other via two conductive wires 36. Some of the hexagonal shaped portions 35 among the plurality of hexagonal-shaped portions 35 are connected to the base 34. Even though the potential difference elimination pattern portion 19C has such a shape, the plurality of connection wirings 24 are short-circuited by the potential difference elimination pattern portion 19C. Therefore, it is possible to suppress the occurrence of potential difference between the plurality of touch sensor pattern portions 21, between the plurality of lead wires 22, between the plurality of connection terminals 23, and between the plurality of connection wirings 24. The adjacent hexagonal-shaped portions 35 among the plurality of hexagonal-shaped portions 35 can also be connected to one another via three or more conductive wires 36. In a case where the potential difference elimination pattern portion 19C has the plurality of hexagonal-shaped portions 35, for example, the touch sensor member precursor 12C is wound into a roll shape such as the winding roll 10 illustrated in FIG. 1, the touch sensor member precursor 12C can be wound while suppressing the occurrence of scratches and winding misalignment since the touch sensor member precursor 12C is not slippery.

Fourth Modified Example

Figure 9:
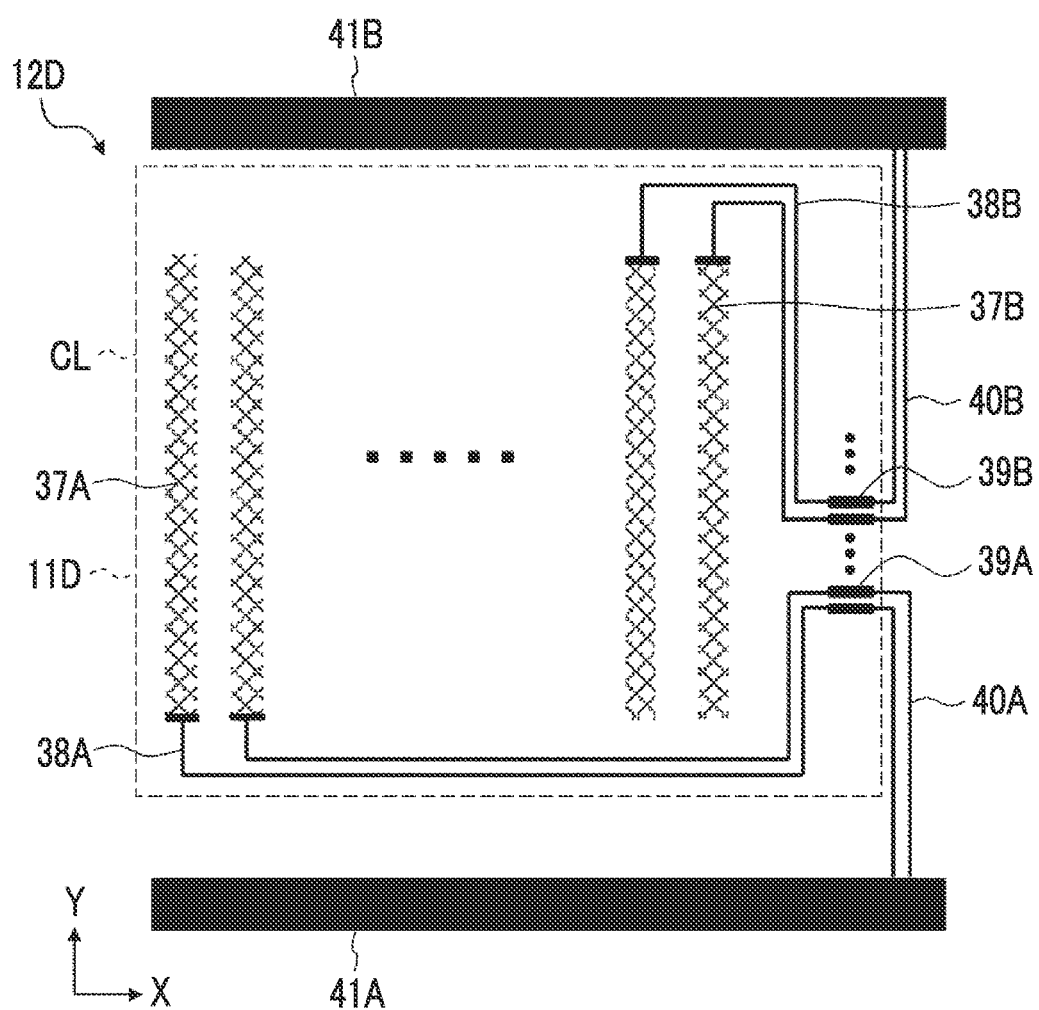
FIG. 9 is a schematic view illustrating a touch sensor member precursor according to a fourth modified example of the embodiment of the present invention.

FIG. 9 illustrates a touch sensor member precursor 12D according to a fourth modified example of the embodiment of the present invention. The touch sensor member precursor 12D includes a plurality of first touch sensor pattern portions 37A, a plurality of first lead wires 38A each of which is connected to one end of each of the plurality of first touch sensor pattern portions 37A in the Y direction, a plurality of first connection terminals 39A connected to the plurality of first lead wires 38A and arranged along the Y direction, a plurality of first connection wirings 40A connected to the plurality of first connection terminals 39A, and a first potential difference elimination pattern, portion 41A connected to the plurality of first connection wirings 40A. In addition, the touch sensor member precursor 12D includes a plurality of second touch sensor pattern portions 37B, a plurality of second lead wires 38B each of which is connected to one end of each of the plurality of second touch sensor pattern portions 37B in the Y direction, a plurality of second connection terminals 39B connected to the plurality of second lead wires 38B and arranged along, the Y direction, a plurality of second connection wirings 40B connected to the plurality of second connection terminals 39B, and a second potential difference elimination pattern portion 41B connected to the plurality of second connection wirings 40B.

In the X direction, the plurality of first connection terminals 39A and the plurality of second connection terminals 39B are disposed between the plurality of first touch sensor pattern portions 37A and the plurality of second touch sensor pattern portions 37B, and the plurality of first connection wirings 40A and the plurality of second connection wirings 40B, the plurality of first lead wires 38A and the plurality of lead wires 38B are connected to ends of the plurality of first connection terminals 39A and the plurality of first connection terminals 39B in the X direction, respectively, and the plurality of first connection wirings 40A and the plurality of second connection wirings 40B are connected to other ends of the plurality of first connection terminals 39A and the plurality of first connection terminals 39B in the X direction. In addition, the plurality of first touch sensor pattern portions 37A, the plurality of second touch sensor pattern portions 37B, the plurality of first lead wires 38A, the plurality of second lead wires 38B, the plurality of first connection terminals 39A, the plurality of second connection terminals 39B, the plurality of first connection wirings 40A, and the plurality of second connection wirings 40B are disposed between the first potential difference elimination pattern portion 41A and the second potential difference elimination pattern portion 41B in the Y direction.

As described above, since the plurality oaf first connection wirings 40A are short-circuited by the first potential difference elimination pattern portion 41A, the occurrence of potential difference between the plurality of first touch sensor pattern portions 37A, between the plurality of first lead wires 38A, between the plurality of first connection terminals 39A, and between the plurality of first connection wirings 40A is suppressed. In addition, since the plurality of second connection wirings 40B are short-circuited by the second potential difference elimination pattern portion 41B, the occurrence of potential difference between the plurality of second touch sensor pattern portions 37B, between the plurality of second lead wires 38B, between the plurality of second connection terminals 39B, and between the plurality of second connection wirings 40B is suppressed.

Furthermore, the plurality of first lead wires 38A, the plurality of first connection terminals 39A, and the plurality of first connection wirings 40A, and the plurality of second lead wires 38B, the plurality of second connection terminals 39B, and the plurality of second connection wirings 40B each satisfy the relationship of (connection wiring width Wd)<(distance Sc between closest terminals) or the relationship of (connection wiring width Wd)<(distance Sb between closest lead wires)<(distance Sc between closest terminals).

In addition, a touch sensor member 11D is manufactured by cutting out the touch sensor member precursor 12D such that the plurality of first connection wirings 40A and the plurality of second connection wirings 40B are cut. In this case, for example, the touch sensor member precursor 12D is cut out according to a cutting line CL illustrated in FIG. 9. In a case where the plurality of first connection wirings 40A and the plurality of second connection wirings 40B are cut, fragments of the plurality of first connection wirings 40A and the plurality of second connection wirings 40B may be scattered. However, in each of the plurality of first lead wires 38A, the plurality of first connection terminals 39A, and the plurality of first connection wirings 40A, and the plurality of second lead wires 38B, the plurality of second connection terminals 39B, and the plurality of second connection wirings 40B, since the relationship of (connection wiring width WA)<(distance Sc between closest terminals) or the relationship of (connection wiring width Wd)<(distance Sb between closest lead wires)<(distance Sc between closest terminals) is satisfied, a short-circuit between the plurality of first lead wires 38A, between the plurality of second lead wires 38B, between the first lead wires 38A and second lead wires 38B adjacent to one another, between the plurality of first connection terminals 39A, between the plurality of second connection terminals 39B, and between the first connection terminals 39A and second connection terminals 39B can be suppressed.

Therefore, according to the touch sensor member precursor 12 of the fourth modified example of the present invention illustrated in FIG. 9, both the discharge phenomenon and short-circuit failure, which occur between the plurality of first lead wires 38A, between the plurality of second lead wires 38B, between the plurality of first connection terminals 39A, and between the plurality of second connection terminals 39B, can be suppressed.

Fifth Modified Example hi the example illustrated in FIG. 3, the potential difference elimination pattern portion 19 is disposed in the pattern formation area 16 and connected to the plurality of connection wirings 24 disposed in the pattern formation area 16, but the potential difference elimination pattern portion 19 can also be connected to the plurality of connection wirings 24 in a plurality of the pattern formation areas 16.

Figure 10:
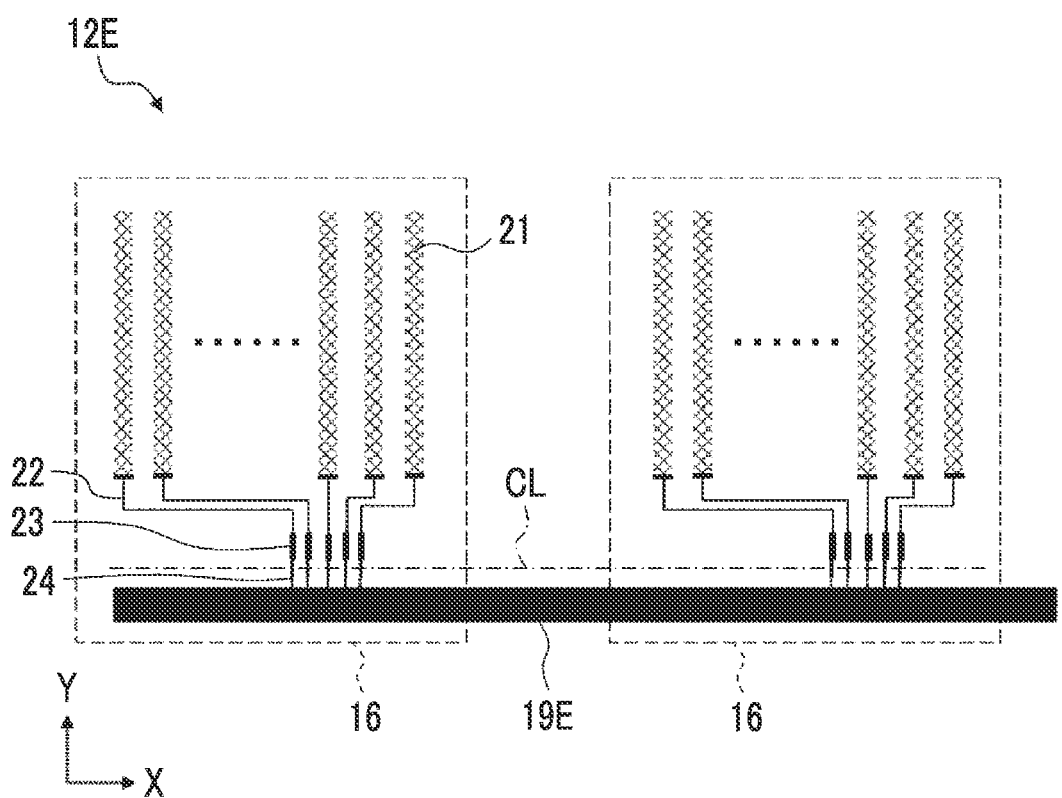
FIG. 10 is a schematic view illustrating a touch sensor member precursor according to a fifth modified example of the embodiment of the present invention.

FIG. 10 illustrates a touch sensor member precursor 12E according to a fifth modified example of the embodiment of the present invention. The potential difference elimination pattern portion 19E of the touch sensor member precursor 12E has a rectangular shape having a long side extending along the X direction and a short side extending along the Y direction, and is connected to the plurality of connection wirings 24 in two pattern formation areas 16 arranged along the X direction. Therefore, the potential difference elimination pattern portion 19E causes a short-circuit between the plurality of connection wirings 24 in the two pattern formation areas 16. Thereby, in the two pattern formation areas 16, it is possible to suppress the occurrence of potential difference between the plurality of touch sensor pattern portions 21, between the plurality of lead wires 22, between the plurality of connection terminals 23, and between the plurality of connection wirings 24.

Sixth Modified Example

Figure 11:
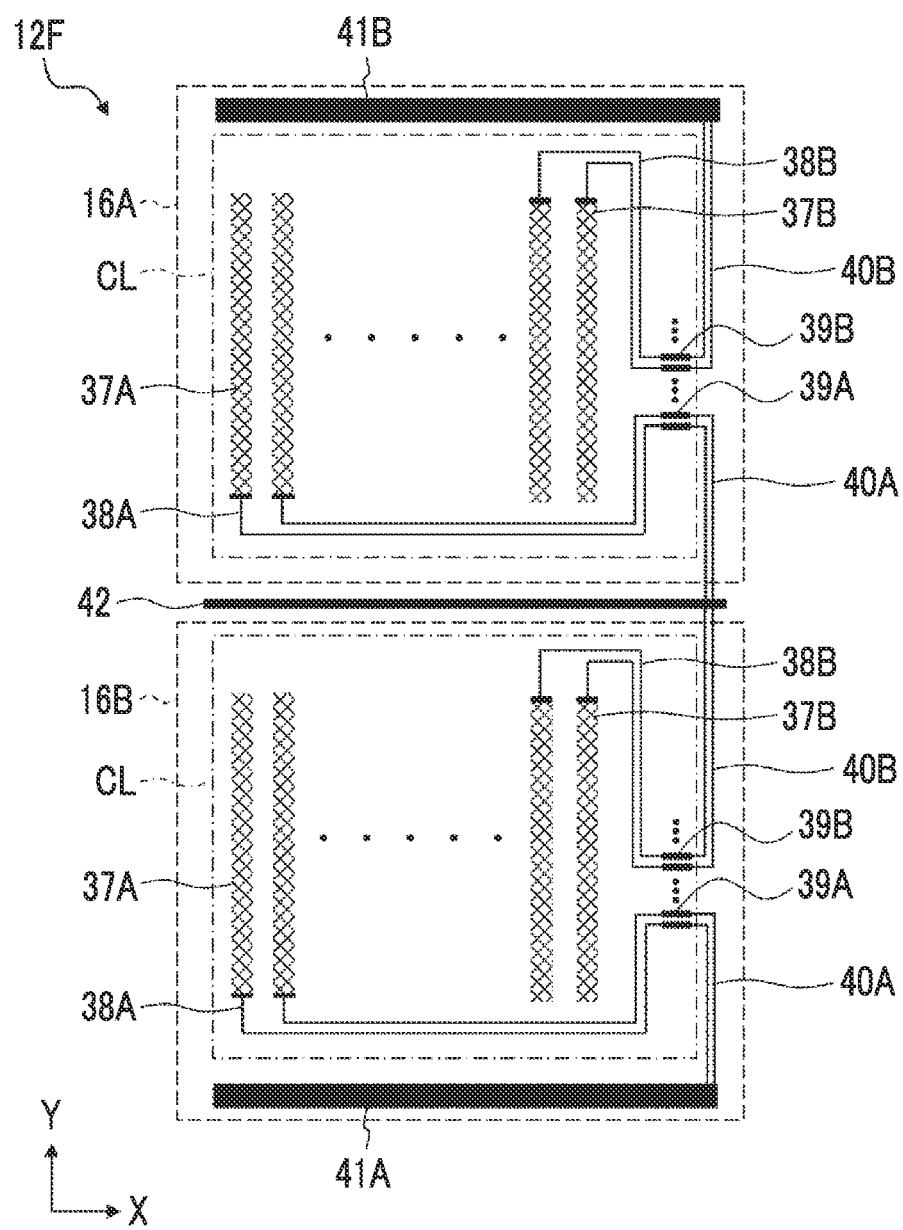
FIG. 11 is a schematic view illustrating a touch sensor member precursor according to a sixth modified example of the embodiment of the present invention.

FIG. 11 illustrates a touch sensor member precursor 12F according to a sixth modified example of the embodiment of the present invention. The touch sensor member precursor 12F includes two pattern formation areas 16A and 16B arranged along the Y direction. In the pattern formation area 16A, the touch sensor member precursor 12D according to the fourth modified example of the embodiment illustrated in FIG. 9, in which the first potential difference elimination pattern portion 41A is removed from the touch sensor member precursor 12D, is disposed, and in the pattern formation area 16B, the touch sensor member precursor 12D from which the second potential difference elimination pattern portion 41B is removed is disposed. In addition, a rectangular third potential difference elimination pattern portion 42 having a long side extending along the X direction and a short side extending along the Y direction is disposed between the pattern formation area 16A and the pattern formation area 16B. The plurality of first connection wirings 40A in the pattern formation area 16A and the plurality of second connection wirings 40B in the pattern formation area 16B are connected to the third potential difference elimination pattern portion 42.

Therefore, the plurality of second connection wirings 40B in the pattern formation area 16A are short-circuited by the second potential difference elimination pattern portion 41B, the plurality of first connection wirings 40A in the pattern formation area 16B are short-circuited by the first potential difference elimination pattern portion 41A, and the plurality of first connection wirings 40A in the pattern formation area 16A and the plurality of second connection wirings 40B in the pattern formation area 16B are short-circuited by the third potential difference elimination pattern portion 42. As a result, it is possible to suppress the occurrence of potential difference between the plurality of first touch sensor pattern portions 37A, between the plurality of second touch sensor pattern portions 37B, between the plurality of first lead wires 38A, and between the plurality of second lead wires 38B, between the plurality of first connection terminals 39A, between the plurality of second connection terminals 39B, between the plurality of first connection wirings 40A, and between the plurality of second connection wirings 40B, in the pattern formation areas 16A and 16B.

Seventh Modified Example

In the examples illustrated in FIGS. 3 and 5, the potential difference elimination pattern portion 19 causes a short-circuit between the plurality of connection wirings 24, but may not cause the short-circuit between the plurality of connection wirings 24 as long as it is possible to suppress the discharge phenomenon occurring between the plurality of touch sensor pattern portions 21, between the plurality of lead wires 22, between the plurality of connection terminals 23, and between the plurality of connection wirings 24.

Figure 12:
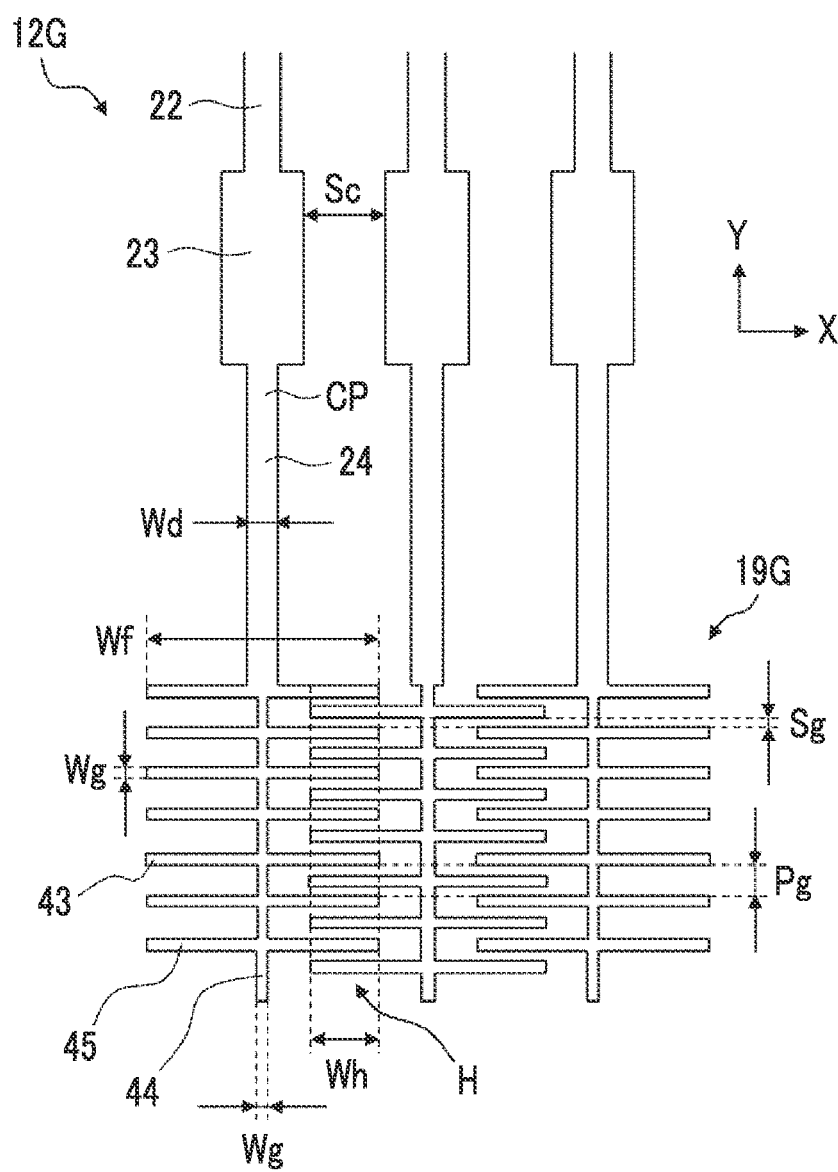
FIG. 12 is a schematic view illustrating a touch sensor member precursor according to a seventh modified example of the embodiment of the present invention.

FIG. 12 illustrates a touch sensor member precursor 12G according to a seventh modified example of the embodiment of the present invention. A potential difference elimination pattern portion 19G of the touch sensor member precursor 12G includes a plurality of sacrifice pattern portions 43. Here, the plurality of sacrifice pattern portions 43 constitutes a pattern in which a distance Sg between closest sacrifice pattern portions, which is a distance between patterns at positions closest to each other, satisfies a relationship of $0<Sg<Sb$ with respect to the distance Sb between closest lead wires. Each of the plurality of sacrifice pattern portions 43 is connected to a corresponding connection wiring 24, and the adjacent sacrifice pattern portions 43 are electrically separated from each other.

The plurality of sacrifice pattern portions 43 includes at least one trunk portion 44 extending along the Y direction and a plurality of branch portions 45 extending along the X direction from both sides of the trunk portion 44 in the X direction, and each of the plurality of sacrifice pattern portions 43 has a sacrifice pattern portion width NW. Each of a plurality of the trunk portions 44 has a line width Wg in the X direction, and each of the plurality of branch portions 45 has the same line width Wg in the Y direction as the line width Wg of each of the trunk portions 44 in the X direction. In addition, the adjacent branch portions 45 are spaced by an interval Pg.

The plurality of branch portions 45 of the adjacent sacrifice pattern portions 43 among the plurality of sacrifice pattern portions 43 overlap each other in the X direction. An overlapping region H where the plurality of branch portions 45 of the adjacent sacrifice pattern portions 43 overlap each other in this way has an overlapping width Wh in the X direction. In the overlapping region H, the adjacent sacrifice pattern portions 43 are closest to each other, and the branch portions 45 closest to each other in the Y direction, among the plurality of branch portions 45 arranged in the Y direction, are spaced by a distance Sg between closest sacrifice pattern portions. Here, for example, a distance between the plurality of branch portions 45 of the overlapping region H in the Y direction is measured by optically imaging an image including the plurality of sacrifice pattern portions 43 using a camera or the like and carrying out image analysis on the imaged image using a personal computer or the like, and a distance between closest branch portions, among distances between the plurality of branch portions 45 obtained as the measurement result, is determined as the distance Sg between closest sacrifice pattern portions.

Here, since the distance Sb between closest lead wires is shorter than the distance. Se between closest terminals of the plurality of connection terminals 23, the discharge phenomenon more easily occurs between the adjacent branch portions 45 in the Y direction, which are spaced from each other by the distance Sg between closest sacrifice pattern portions in the overlapping region than between the connection terminals 23 adjacent to each other, which are spaced by the distance Sc between closest terminals, and between the lead wires 22 adjacent to each other, which are spaced by the distance Sb between closest lead wires. The distance Sg between closest sacrifice pattern portions is set so that the relationship of 0<(distance Sg between closest sacrifice pattern portions)<(distance Sb between closest lead wires) is satisfied. Therefore, even though the potential difference occurs between the plurality of touch sensor pattern portions 21, between the plurality of lead wires 22, between the plurality of connection terminals 23, and between the plurality of connection wirings 24, the discharge phenomenon occurring between the plurality of touch sensor pattern portions 21, between the plurality of lead wires 22, between the plurality of connection terminals 23, and between the plurality of connection wirings 24 is eliminated by causing the discharge phenomenon to occur between the plurality of sacrifice pattern portions 43, so that it is possible to suppress the occurrence of the discharge phenomenon between the plurality of touch sensor pattern portions 21, between the plurality of lead wires 22, between the plurality of connection terminals 23, and between the plurality of connection wirings 24.

Eighth Modified Example

In the example illustrated in FIG. 4, the touch sensor pattern portion 21 has a diamond-shaped mesh pattern 30 formed by the plurality of conductive wires 32 intersecting one another, but for example, a disconnection portion can be formed in some of the plurality of conductive wires 32.

Figure 13:
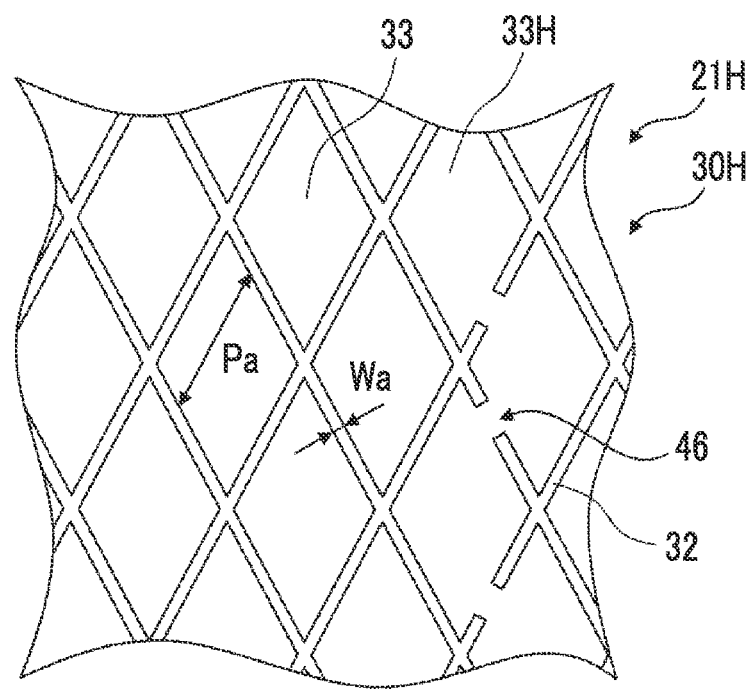
FIG. 13 is a schematic view illustrating a touch sensor pattern portion according to an eighth modified example of the embodiment of the present invention.

FIG. 13 illustrates a touch sensor pattern portion 21H in an eighth modified example of the embodiment of the present invention. The touch sensor pattern portion 21H has a diamond-shaped mesh pattern 30H formed by the plurality of conductive wires 32 intersecting one another, but at least one disconnection portion 46 having a length of, for example, 15 μm or the like in some of the plurality of conductive wires 32 is formed. By forming the disconnection portion 46 in this way, an opening portion 33H having a larger area than that of the diamond-shaped opening portion 33 is formed. Here, as the opening width Pa of the opening portion 33 is narrower, the parasitic capacitance in the touch sensor pattern portion 21H increases, and the touch sensitivity decreases. However, the parasitic capacitance in the touch sensor pattern portion 21H is alleviated by the formation of the opening portion 33H having a relatively large area, and as a result, the touch sensitivity can be improved.

Hereinafter, each member of the touch sensor member precursor 12 will be described in detail.

<Substrate>

The substrate 14 supports the plurality of touch sensor pattern portions 21, the plurality of lead wires 22, the plurality of connection terminals 23, the plurality of connection wirings 24, and the potential difference elimination pattern portion 19, and can have flexibility.

The types of the substrate 14 are not particularly limited as long as the substrate 14 can support the plurality of touch sensor pattern portions 21, the plurality of lead wires 22, the plurality of connection terminals 23, the plurality of connection wirings 24, and the potential difference elimination pattern portion 19. However, depending on the application, the substrate 14 is preferably transparent. In this case, it is particularly preferable that the substrate 14 is formed of a plastic sheet.

Specific examples of materials for forming the substrate 14 preferably include plastic films with a melting point of about 290° C. or lower such as polyethylene terephthalate (PET) (258° C.), polycycloolefin (134° C.), polycarbonate (250° C.), a (meth)acrylic resin (128° C.), polyethylene naphthalate (PEN) (269° C.), polyethylene (PE) (135° C.), polypropylene (PP) (163° C.), polystyrene (230° C.), polyvinyl chloride (180° C.), polyvinylidene chloride (212° C.), polyvinylidene difluoride (PVDF) (177° C.), polyarylate (PAR) (250° C.), polyethersulfone (PES) (225° C.), a polymer acrylic resin, a fluorene derivative (140° C.), a crystalline cyclo olefin polymer (COP) (165° C.), and triacetylcellulose (TAC) (290° C.), and a (meta)acrylic resin, PET, polycycloolefin, or polycarbonate is more preferable. The numerical value in parentheses is the melting point or the glass transition temperature.

The total light transmittance of the substrate 14 is preferably 85% to 100%.

The thickness of the substrate 14 is not particularly limited, but generally, the thickness can be optionally selected in a range of 25 μm or greater and 500 μm or smaller from the viewpoint of the application to a touch panel. In a case where a function of a touch surface is also used in addition to the function of the substrate, it is possible to design with a thickness of greater than 500 μm.

An example of a suitable form of the substrate 14 includes a treated support that has been subjected to at least one treatment selected from the group consisting of atmospheric pressure plasma treatment, corona discharge treatment, and ultraviolet irradiation treatment. By carrying out the above treatment, a hydrophilic group such as an OH group is introduced on a surface of the treated support, and the adhesiveness of the plurality of touch sensor pattern portions 21, the plurality of lead wires 22, the plurality of connection terminals 23, the plurality of connection wirings 24, and the potential difference elimination pattern portion 19 is further improved.

As another suitable form of the substrate 14, a configuration in which an undercoat layer containing a polymer on a surface thereof is provided may be used. By forming the plurality of touch sensor pattern portions 21, the plurality of lead wires 22, the plurality of connection terminals 23, the plurality of connection wirings 24, and the potential difference elimination pattern portion 19 on the undercoat layer, the adhesiveness of the plurality of touch sensor pattern portions 21, the plurality of lead wires 22, the plurality of connection terminals 23, the plurality of connection wirings 24, and the potential difference elimination pattern portion 19 is further improved.

A method for forming the undercoat layer is not particularly limited, and examples thereof include a method in which a composition for forming an undercoat layer, which contains a polymer, is applied onto a substrate and heat-treated as necessary. The composition for forming an undercoat layer may contain a solvent, as necessary. The type of the solvent is not particularly limited, and known solvents are exemplified. As the composition for forming an undercoat layer, which contains a polymer, a latex containing polymer fine particles may be used.

A thickness of the undercoat layer is not particularly limited, but from the view point that the adhesiveness of the plurality of touch sensor pattern portions 21, the plurality of lead wires 22, the plurality of connection terminals 23, the plurality of connection wirings 24, and the potential difference elimination pattern portion 19 is more excellent, the thickness is preferably 0.02 µm or greater and 0.30 µm or smaller, and more preferably 0.03 µm or greater and 0.20 µm or smaller.

<Conductive Member>

A thickness of a conductive member constituting each of the plurality of touch sensor pattern portions 21, the plurality of lead wires 22, the plurality of connection terminals 23, the plurality of connection wirings 24, and the potential difference elimination pattern portion 19 is not particularly limited, but is preferably 0.01 µm or greater and 200.00 µm or smaller, more preferably 30.00 µm or smaller, even more preferably 20.00 µm or smaller, particularly preferably 0.01 µm or greater and 9.00 µm or smaller, and most preferably 0.05 µm or greater and 5.00 µm or smaller. Within the above range, low resistance is achieved, and durability is excellent.

Examples of the material constituting the conductive member include metals such as gold (Au), silver (Ag), molybdenum (Mo), copper (Cu), titanium (Ti), aluminum (Al) and tungsten (W), alloys, or the like. Among these, silver (Ag) is preferably contained because of its excellent conductivity.

In addition to metal, the conductive member may be made of, for example, conductive fibers such as carbon nanotubes (CNTs) and carbon nanobuds (CNBs), or may be a combination thereof.

The conductive member may contain a binder and metal parts dispersed in the binder. The conductive member containing the metal parts dispersed in the binder has excellent adhesiveness between the conductive member and the substrate 14. Therefore, in a case where the plurality of connection wirings 24 are formed of such a conductive member, it is possible to reduce the generation of fragments when the plurality of connection wirings 24 are cut. Even though the fragments of the plurality of connection wirings 24 are generated, some of the generated fragments are covered with the binder. Therefore, a probability in which a short-circuit failure occurs between the lead wires 22 adjacent to each other and between the connection terminals 23 adjacent to each other can be reduced. Thus, it is preferable that a conductive member containing the metal parts dispersed in the binder is used as the conductive member constituting each of the plurality of touch sensor pattern portions 21, the plurality of lead wires 22, the plurality of connection terminals 23, the plurality of connection wirings 24, and the potential difference elimination pattern portion 19.

As the binder, a resin is preferable from the reason that the adhesiveness between the conductive member and the substrate 14 is more excellent, and specific examples thereof include at least resins selected from the group consisting of a (meth)acrylic-based resin, a styrene-based resin, a vinyl-based resin, a polyolefin-based resin, a polyester-based resin, a polyurethane-based resin, a polyamide-based resin, a polycarbonate-based resin, a polydiene-based resin, an epoxy-based resin, a silicone-based resin, a cellulose-based polymer, and a chitosan-based polymer, or copolymers composed of monomers constituting these resins.

More specifically, the hinder described above contains a first polymer and a second polymer having a lower glass transition temperature than the first polymer. In the present specification, the glass transition temperature of the polymer means the glass transition temperature measured by the differential scanning calorimetry (DSC) method. The glass transition temperature is measured by using "Testing Methods for Transition Temperatures of Plastics" defined in JIS K7121 (2012).

Examples of the first polymer and the second polymer include hydrophobic polymers (hydrophobic resins), and the like, and specific examples thereof include at least resins selected from the group consisting of an acrylic-based resin, a styrene-based resin, a vinyl-based resin, a polyolefin-based resin, a polyester-based resin, a polyurethane-based resin, a polyamide-based resin, a polycarbonate-based resin, a polydiene-based resin, an epoxy-based resin, a silicone-based resin, a cellulose-based polymer, and a chitosan-based polymer, or copolymers composed of monomers constituting these resins.

It is preferable that the polymer contains a reactive group that reacts with a crosslinking agent described later.

The polymer preferably has at least one unit selected from the group consisting of the following Formulae A, B, C, and D.

Among these, as the first polymer, a polymer consisting of one unit selected from the group consisting of Formulae A, B, C, and D is preferable from the viewpoint that the glass transition temperature is more easily controlled to be lowered.

A polymer consisting of at least one unit selected from the group consisting of Formulae B, C, and D is more preferable, and a polymer consisting of a unit represented by Formula. D is even more preferable.

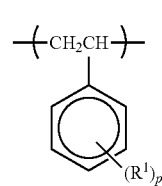

A

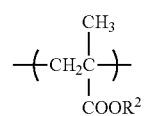

B

C

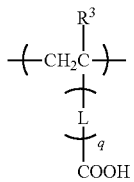

D

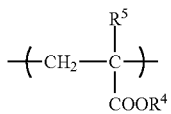

$R^1$ represents a methyl group or a halogen atom, and preferably represents a methyl group, a chlorine atom, or a bromine atom. p represents an integer of 0 to 2, preferably 0 or 1, and more preferably 0.

$R^2$ represents a methyl group or an ethyl group, and a methyl group is preferable.

$R^3$ represents a hydrogen atom or a methyl group, and a hydrogen atom is preferable. L represents a divalent linking group, and a group represented by the following General Formula (2) is preferable.

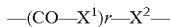 General Formula (2):

In Formula, $X^1$ represents an oxygen atom or $-NR^{30}-$. Here, $R^{30}$ represents a hydrogen atom, an alkyl group, an aryl group, or an acyl group, and each of them may contain a substituent (for example, a halogen atom, a nitro group, a hydroxyl group, or the like). $R^{30}$ is preferably a hydrogen atom, an alkyl group having 1 to 10 carbon atoms (for example, a methyl group, an ethyl group, an n-butyl group, an n-octyl group, or the like), or an acyl group (for example; an acetyl group, a benzoyl group, or the like). $X^1$ is particularly preferably an oxygen atom or NH—.

$X^2$ represents an alkylene group, an arylene group, an alkylene arylene group, an arylene alkylene group, or an alkylene arylene alkylene group, and —O—, —S—, —OCO—, —CO—, —COO—, —NH—, —SO$_2$—, —N(R$^{31}$)—, or —N(R$^{31}$)SO$_2$— may be inserted in the middle of each of these groups. Here, $R^{31}$ represents a linear or branched alkyl group having 1 to 6 carbon atoms, and examples thereof include a methyl group, an ethyl group, an isopropyl group, and the like. Preferred examples of $X^2$ include a dimethylene group, a trimethylene group, a tetramethylene group, an o-phenylene group, a m-phenylene group, a p-phenylene group, —CH$_2$CH$_2$OCOCH$_2$CH$_2$—, —CH$_2$CH$_2$OCO(C$_6$H$_4$)—, and the like.

r represents 0 or 1.

q represents 0 or 1 and is preferably 0.

$R^4$ represents an alkyl group having 1 to 80 carbon atoms, an alkenyl group, or an alkynyl group, the first polymer is preferably an alkyl group having 1 to 5 carbon atoms, and the second polymer is preferably an alkyl group having 5 to 50 carbon atoms, more preferably an alkyl group having 5 to 30 carbon atoms, and even more preferably an alkyl group having 5 to 20 carbon atoms.

$R^5$ represents a hydrogen atom, a methyl group, an ethyl group, a halogen atom, or —CH$_2$COOR$^6$, a hydrogen atom, a methyl group, a halogen atom, or —CH$_2$COOR$^6$ is preferable, a hydrogen atom, a methyl group, or —CH$_2$COOR$^6$ is more preferable, and a hydrogen atom is particularly preferable.

$R^6$ represents a hydrogen atom or an alkyl group having 1 to 80 carbon atoms, may be the same as or different from $R^4$, and $R^6$ preferably has 1 to 70 carbon atoms and more preferably has 1 to 60 carbon atoms.

An example of another suitable form of the first polymer and the second polymer includes a polymer (copolymer) represented by the following General Formula (1) from the viewpoint of capable of further preventing the infiltration of water.

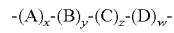 General Formula (1):

In General Formula (1), A, C, and D each represent the above-mentioned repeating units that are already described.

In General Formula (1), each of x, y, z, and w represents a molar ratio of each repeating unit.

x is 3 mol % to 60 mol %, preferably 3 mol % to 50 mol %, and more preferably 3 mol % to 40 mol %.

y is 30 mol % to 96 mol %, preferably 35 mol % to 95 mol %, and more preferably 40 mol % to 90 mol %.

z is 0.5 mol % to 25 mol %, preferably 0.5 mol % to 20 mol %, and more preferably 1 mol % to 20 mol %.

w is 0.5 mol % to 40 mol %, and preferably 0.5 mol % to 30 mol %.

In General Formula (1), it is particularly preferable that x is 3 mol % to 40 mol %, y is 40 mol % to 90 mol %, z is 0.5 mol % to 20 mol %, and w is 0.5 mol % to 10 mol %.

As the polymers represented by General Formula (1), polymers represented by the following General Formulae (2) and (3) are preferable.

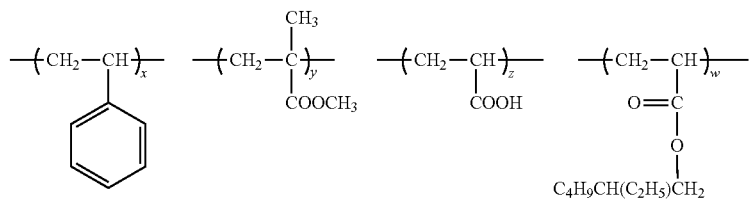

General Formula (2)

In General Formula (2), x, y, z, and w are as defined above.

General Formula (3)

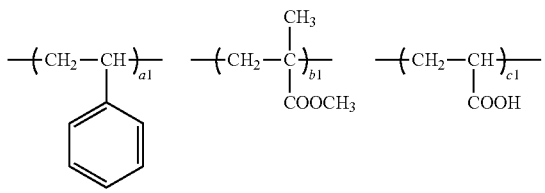 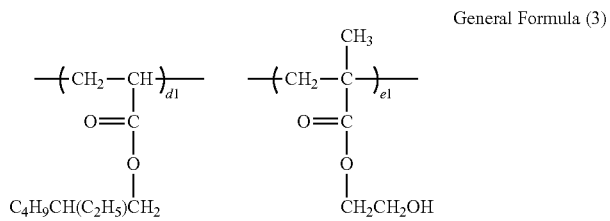

In the above Formula, each of a1, b1, c1, d1, and e1 represents a molar ratio of each monomer unit, a1 represents 3 to 60 (mol %), b1 represents 30 to 95 (mol %), e1 represents 0.5 to 25 (mol %), d1 represents 0.5 to 40 (mol %), and e1 represents 1 to 10 (mol %).

The preferred range of a1 is the same as the preferred range of x described above, the preferred range of b1 is the same as the preferred range of y described above, the preferred range of c1 is the same as the preferred range of z described above, and the preferred range of d1 is the same as the preferred range of w described above.

e1 is 1 mol % to 10 mol %, preferably 2 mol % to 9 mol %, and more preferably 2 mol % to 8 mol %.

The weight-average molecular weight of the polymers represented by General Formula (1) is preferably 1,000 to 1,000,000, more preferably 2,000 to 750,000, and even more preferably 3,000 to 500,000.

The polymers represented by General Formula (1) can be synthesized with reference to, for example, JP3305459B and JP3754745B.

The glass transition temperature of each of the first polymer and the second polymer is not particularly limited, but the glass transition temperature of the first polymer is preferably 0° C. or higher, more preferably 25° C. or higher, and even more preferably higher than 40° C. The upper limit is not particularly limited, but is generally preferably 120° C. or lower.

The glass transition temperature of the second polymer is not particularly limited, but is preferably 40° C. or lower, more preferably 25° C. or lower, even more preferably lower than 25° C., particularly preferably 0° C. or lower, and most preferably lower than 0° C. The lower limit is not particularly limited, but is generally preferably −50° C. or higher.

The difference (absolute value) between the glass transition temperature of the first polymer and the glass transition temperature of the second polymer is not particularly limited, but is generally preferably 20° C. or higher and 100° C. or lower.

In the conductive member, the metal parts dispersed in the binder are parts in which the conductive property is secured, and the metal parts are made of metal. Metal constituting the metal parts is preferably at least one kind of metal selected from the group consisting of gold (metallic gold), silver (metallic silver), copper (metallic copper), nickel (metallic nickel), and palladium (metallic palladium) from the viewpoint of the more excellent conductive property.

Figure 14:
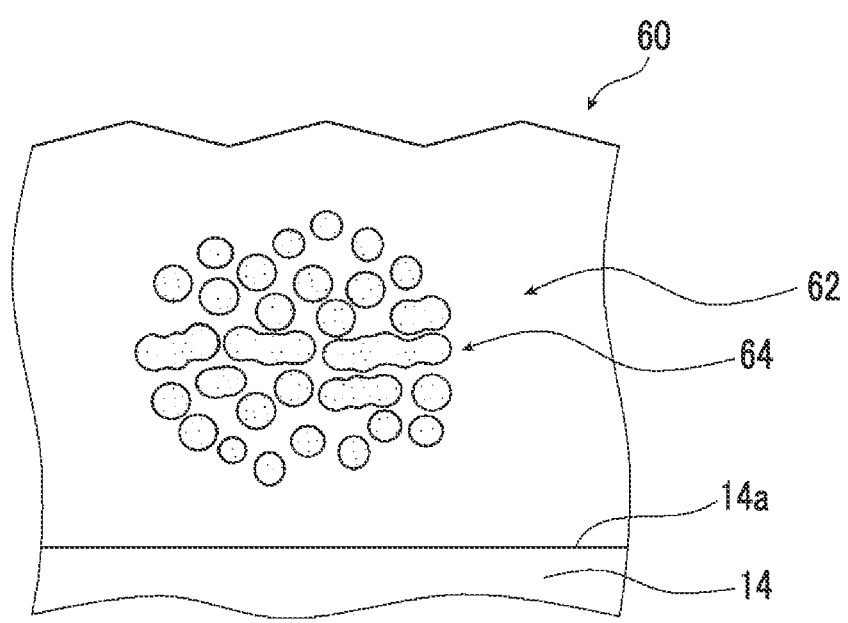
FIG. 14 is an enlarged schematic view illustrating an example of a conductive member in the touch sensor member precursor of the embodiment of the present invention.

FIG. 14 is a schematic view illustrating an enlarged example of a cross-section of a conductive member 60 constituting each of the plurality of touch sensor pattern portions 21, the plurality of lead wires 22, the plurality of connection terminals 23, the plurality of connection wirings 24, and the potential difference elimination pattern portion 19 of the touch sensor member precursor 12 according to the embodiment of the present invention. In the example illustrated in FIG. 14, the conductive member 60 includes a binder 62 containing the first polymer and the second polymer, and a plurality of metal parts 64 dispersed in the binder 62, and each of the plurality of metal parts 64 has a particulate shape. As described above, the form in which each of the metal parts 64 may be formed into the particulate shape and dispersed in the conductive member is illustrated, but the form of each of the metal parts 64 is not limited to the particulate shape, and the metal parts 64 may be formed into a lamination shape and dispersed in the binder 62 of the conductive member.

The conductive member may contain materials other than the above materials. Examples of materials other than the above materials include icon-metal fine particles. Examples of the non-metal fine particles include resin particles, metal oxide particles, and the like, and metal oxide particles are preferable.

Examples of the metal oxide particles include silicon oxide particles and titanium oxide particles.

An average particle diameter of the non-metal fine particles is not particularly limited, but is preferably 1 nm or greater and 1000 min or smaller, more preferably 10 nm or greater and 500 nm or smaller, and even more preferably 20 nm or greater and 200 nm or smaller in terms of the equivalent sphere diameter. In a case where the average particle diameter is within the above range, a detecting portion tends to have more excellent transparency and more excellent conductivity.

The equivalent sphere diameter of the non-metal fine particles is obtained by calculating equivalent sphere diameters of any 50 particles using a transmission electron microscope and arithmetically averaging the calculated results.

The conductive member preferably has a metal stabilizer on a surface or the inside of each of the metal parts, or in the binder for the purpose of stabilizing the metal parts. As the metal stabilizer, the following materials can be used alone or in combination.

Corrosion inhibitors described in JP2009-505358A, paragraphs 0075 to 0086

Metal ion trapping agents described in JP2009-188360A, paragraphs 0077 to 0092

Nitrogen-containing heterocyclic compounds containing a mercapto group described in JP2012-146548A, paragraphs 0044 to 0047

Compositions for forming a silver ion diffusion inhibitory layer described in JP2013-224397A, paragraphs 0018 to 0049

Compounds for forming a silver ion diffusion inhibitory layer described in JP2014-075115A, paragraphs 0030 to 0066

Rust inhibitors described in JP2018-024784A paragraphs 0050 to 0057

Mercaptobenzothiazoles described in JP2019-016488A, paragraphs 0050 to 0057

As the metal stabilizer, preferable compounds or salts thereof are as follows:

2-Mercaptobenzothiazole, 2-mercaptobenzimidazole, 5-mereapto-1-phenyl-1H-tetrazole, 1-(4-carboxyphenyl)-5-mercapto-1H-tetrazole, 3-mereapto-1,2,4-triazole, 1-(m-sulfophenyl)-5-mercapto-1H-tetrazole sodium, 2-mercaptobenzoxazole, 1,2,3-benzotriazole, 1-(3-acetamidophenyl)-5-mercaptotetrazole, 5-amino-2-mercaptobenzimidazole, 6-amino-2-mercaptobenzothiazole, thiothianuic acid, 6-(dibutylamino)-1,3,5-triazine-2,4-dithiol, 2-mercaptothiazolin, diethylammonium diethyldithiocarbamate, (2-benzthiazolylthio)acetic acid, 3-(2-benzthiazolylthio)propionic acid, 6-(dibutylamino)-1,3,5-triazine-2,4-dithio 2-amino-5-mercapto-1,3,4-thiazylazole, 2-mercapto-5-methylthio-1,3,4-thiadiazole, 2-mercapto-5-ethylthio-1,3,4-thiadiazole, 2-5-dimercapto-1,3,4-thiadiazole, 2-thioacetic acid-5mercapto-1,3,4-thiadiazole, 2-aminopyrimidine, 5,6-dimethylbenzimidazole, and 2-mercaptopyrimidine.

Among these, as the metal stabilizer, a compound having a mercaptothiazole skeleton or a mercaptothiadiazole skeleton, or a compound selected from salts thereof is particularly effective for improving sulfide resistance and is most preferable. Specific examples of the most preferable compounds include 2-mercaptobenzothiazole, 5-methyl-2-mercaptobenzothiazole, 2-amino-5-mercapto-1,3,4-thiadiazole, 2-mercapto-5-methylthio-1,3,4-thiadiazole, 2-mercapto-5-ethylthio-1,3,4-thiadiazole, 2-5-dimercapto-1,3,4-thiadiazole, and derivatives or salts thereof.

The introduction of the metal stabilizer is useful for improving the durability of the metal materials in a non-bending portion and a bending portion, and is particularly effective and preferable for suppressing migration and sulfurization in a case where the conductive member contains silver. As a method of introducing the metal stabilizer, a method for bringing the touch sensor member precursor 12 or the touch sensor member 11 in contact with a solution containing the metal stabilizers during or after the formation of the conductive member by application or immersion, or a method for depositing the metal stabilizers on the touch sensor member precursor 12 or the touch sensor member 11 by a vapor phase reaction with steaming or the like can be preferably used.

The amount of the metal stabilizer used is not limited, but the metal stabilizer is preferably contained within a range of 1 mg/m$^2$ or more and 10 g/m$^2$ or less and even more preferably contained within a range of 10 mg/m$^2$ or more and 1 g/m$^2$ or less, with respect to the conductive member disposed on the substrate 14 of the touch sensor member precursor 12.

As necessary, the following layer can be additionally provided on the touch sensor member precursor 12.

<Insulating Layer>

For the purpose of protecting the plurality of touch sensor pattern portions 21 and the plurality of lead wires 22, an insulating layer that is transparent and electrically insulated may be provided on the plurality of touch sensor pattern portions 21 and the plurality of lead wires 22. A configuration of the insulating layer is not particularly limited, and for example, an optical clear resin (OCR) such as an optical clear adhesive (OCA) and an ultra violet (UV) cured resin can be used. The insulating layer may be partially hollow.

The insulating layer can be disposed so that a part of each of the touch sensor pattern portions 21 and a part of each of the lead wires 22 are exposed, that is, a part of each of the touch sensor pattern portions 21 and a part of each of the lead wires 22 are not covered.

As the insulating layer, an optical clear adhesive and an optical clear resin can be used as described above, but the insulating layer is not limited thereto, and a transparent insulating layer having a property of transmitting light can be used.

It is preferable that an insulating layer consisting of the same material is disposed on the touch sensor pattern portions 21 and the lead wires 22 from the viewpoint that the insulating layer can be formed by an application step being carried out one time.

As the insulating layer, a layer into which a crosslinking structure is introduced and in which indentation hardness of the insulating layer is adjusted to a predetermined range can be used.

In the conductive member constituting each of the plurality of touch sensor pattern portions 21, the plurality of lead wires 22, the plurality of connection terminals 23, the plurality of connection wirings 24, and the potential difference elimination pattern portion 19, it is presumed that damage such as fissuring occurs due to the stress associated with the bending form of the conductive member in storage environment conditions. Therefore, by relaxing the stress on a surface of the conductive member and laying an insulating layer having a function of reinforcing the strength of the conductive member, it is possible to prevent the conductive member from being damaged due to the stress. Specifically, in order to impart the function of reinforcing the strength to the insulating layer, a crosslinking structure is introduced into the insulating layer, and as a result, the superior stiffness of the insulating layer is maintained. The indentation hardness of the insulating layer is adjusted within a predetermined range so as to prevent the insulating layer from cracking and breaking the conductive member due to the bending.

The indentation hardness of the insulating layer is 200 MPa or less, preferably 150 MPa or less, and more preferably 130 MPa or less. The lower limit is not particularly limited, but 10 MPa or more is preferable. In a ease where the indentation hardness is 200 MPa or less, the desired effect can be easily obtained.

The indentation hardness of the insulating layer can be measured by, for example, a microhardness tester (picodenter).

In addition, in order for the insulating layer to exhibit the above-mentioned indentation hardness, it is preferable that a main chain structure of a resin constituting the insulating layer is a soft structure or a structure in which the distance between the crosslinking points is long.

An elastic modulus of the insulating layer at 50° C. to 90° C. is preferably $1 \times 10^5$ Pa or more, and more preferably $1 \times 10^6$ or more and $1 \times 10^{10}$ MPa or less. For example, in a case where the substrate 14 thermally expands, the conductive member formed on the substrate 14 that has an expansion factor lower than that of the substrate 14 also extends, which may cause the conductive member to break. On the other hand, in a case where the elastic modulus of the insulating layer at 50° C. to 90° C. is within the above-mentioned range, even though the conductive member is bent in a high temperature and high humidity environment, the insulating layer is hard and difficult to extend, so that fissuring and breaking of the conductive member is less likely to occur.

The elastic modulus of the insulating layer at a temperature of 85° C. and a relative humidity of 85% is preferably $1\times10^5$ Pa or more, and more preferably $1\times10^6$ Pa or more, and even more preferably $1.5\times10^6$ Pa or more. The upper limit is not particularly limited, but is $1\times10^{10}$ MPa or less in many cases. In a case where the elastic modulus is within the above-mentioned range, even though the conductive member is bent in a high temperature and high humidity environment, fissuring and breaking of the conductive member is less likely to occur.

The elastic modulus of the insulating layer can be measured by a microhardness tester (picodenter) in a predetermined measurement environment, for example, at a temperature of 85° C. and a relative humidity of 85%.

A linear expansion factor of the insulating layer is not particularly limited, but is preferably 1 ppm/° C. or higher and 500 ppm/° C. or lower, more preferably 5 ppm/° C. or higher and 200 ppm/° C. or lower, and even more preferably 5 ppm/° C. or higher and 150 ppm/° C. or lower. In a case where the linear expansion factor of the insulating layer is within the above-mentioned range, even though the conductive member is bent in a high temperature and high humidity environment, fissuring and breaking of the conductive member is less likely to occur.

The linear expansion factor of the insulating layer can be calculated from the following two equations by measuring a curl value (curvature radius of curl) in a case where heat is applied to a measurement sample consisting of the insulating layer.

(Linear expansion factor of insulating layer−linear expansion factor of substrate 14)×temperature difference=distortion of measurement sample    Equation 1:

Distortion of measurement sample={elastic modulus of substrate 14×(thickness of substrate 14)$^2$}/{3×(1−Poisson's ratio of substrate 14)×elastic modulus of insulating layer×curvature radius of curl}    Equation 2:

The linear expansion factor of the insulating layer preferably has a small difference from a linear expansion factor of the substrate 14 in that the breaking of the conductive member can be farther suppressed, and the upper limit of the difference is preferably 300 ppm/° C. or lower and more preferably 150 ppm/° C. or lower. The lower limit is not particularly limited, but may be 0 ppm/° C.

A thickness of the insulating layer is not particularly limited, but in a case where the thickness is large, cracks are likely to occur in the insulating layer during the bending. From the viewpoints of suppressing cracks, having more excellent adhesiveness to the conductive member, and having more excellent film hardness, it is preferable that the thickness is 1 pun or greater and 20 μm or smaller, and more preferably 5 μm or greater and 15 μm or smaller.

The total light transmittance of the touch sensor member precursor 12 including the insulating layer is preferably 85% or more and more preferably 90% or more, with respect to the visible light region (wavelength of 400 nm to 700 nm).

The above-mentioned total light transmittance is measured by a spectrophotometric colorimeter CM-3600A (manufactured by Konica Minolta, Inc.).

In addition, the total light transmittance of the insulating layer itself is preferably adjusted so that the touch sensor member precursor 12 exhibits the above-mentioned total light transmittance, and is preferably at least 85% or more.

The insulating layer preferably has the excellent adhesiveness to each of the touch sensor pattern portions 21 and the lead wires 22, and specifically, it is more preferable that the insulating layer has the adhesiveness in which there is no peeling in the test for evaluating tape adhesion by "610" manufactured by 3M.

Since the insulating layer may be in contact with not only each of the touch sensor pattern portions 21 and the lead wires 22 but also the substrate 14, it is preferable that the insulating layer has excellent adhesiveness to the substrate 14.

In a case where the adhesiveness between the insulating layer and the substrate 14, the touch sensor pattern portions 21, and the lead wires 22 is high as described above, the fissuring and breaking of the conductive member can be further suppressed.

From the viewpoint of suppressing the surface reflection of the touch sensor member precursor 12, it is preferable that a refractive index difference between a refractive index of the insulating layer and a refractive index of the substrate 14 is small.

In a case where the conductive member constituting each of the touch sensor pattern portions 21 and the lead wires 22 contains a binder component, it is preferable that a refractive index difference between the refractive index of the insulating layer and the above-mentioned refractive index of the binder component is small, and it is more preferable that a resin component for forming the insulating layer and the above-mentioned binder component are composed of the same material.

The resin component for forming the insulating layer and the above-mentioned binder component being composed of the same material can be exemplified as an example in which both the binder component and the resin component for forming the insulating layer are a (meth)acrylic resin.

In a case where a touch panel is formed by using the touch sensor member precursor 12 as described above, an optical clear adhesive sheet or a pressure-sensitive adhesive layer may be further bonded to the insulating layer of the touch sensor member precursor 12. In order to suppress light scattering at an interface between the insulating layer and the optical clear adhesive sheet or pressure-sensitive adhesive layer, it is preferable that a refractive index difference between the refractive index of the insulating layer and a refractive index of the optical clear adhesive sheet or a refractive index of the pressure-sensitive adhesive layer is small.

The insulating layer includes a crosslinking structure. Due to the inclusion of the crosslinking structure, even though the conductive member is bent in a high temperature and high humidity environment, the conductive member is less likely to break.

The material constituting the insulating layer is not particularly limited as long as a layer exhibiting the above-mentioned properties can be obtained. Among these, a layer formed by using a composition for forming an insulating layer that contains a polymerizable compound having a polymerizable group is preferable in that the properties of the insulating layer can be easily controlled.

A method for forming an insulating layer by using a composition for forming an insulating layer is not particularly limited. Examples of the method for forming an insulating layer include a method for applying a composition for forming an insulating layer on the substrate 14, the touch sensor pattern portions 21, and the lead wires 22, and as necessary, curing a coating film to form an insulating layer (coating method) and a method for forming an insulating layer on a temporary substrate and transferring the insulating layer to surfaces of the touch sensor pattern portions 21 and the lead wires 22 (transfer method). Among these, the coating method is preferable from the viewpoint of easy control of the thickness.

In addition, a metal stabilizer may be contained in the insulating layer. In particular, by incorporating the metal stabilizer into the insulating layer in advance, it is not necessary to bring a solvent required for dissolving the metal stabilizer into contact with the conductive member, and damage to the conductive member or the binder due to the solvent can be avoided, which is preferable. Therefore, it is preferable that the insulating layer contains the metal stabilizer.

In the plurality of touch sensor pattern portions 21 composed of the conductive member, there is a possibility that resistance changes over time. However, it is possible to suppress a change in the resistance of the conductive member by the insulating layer containing the metal stabilizer. Therefore, it is possible to suppress a change in the touch sensitivity of the touch sensor member 11 over time.

Example of Using Touch Sensor Member

The touch sensor member 11 manufactured by using the touch sensor member precursor 12 according to the embodiment of the present invention can have functions such as a contact detection for detecting the contact or approach of an object such as a user's finger or a stylus pen, a signal detection for detecting signals such as electromagnetic waves, and noise cutting for blocking electromagnetic waves of a specific frequency coming from the outside. Although not illustrated, the touch sensor member 11 having such functions is disposed on a display surface of an image display module, and is used in a state of being covered with a transparent insulating cover panel from above. For example, in a case where the user's finger, the stylus pen, or the like touches or approaches the cover panel on the plurality of touch sensor pattern portions 21 of the touch sensor member 11, a position where the user's finger, the stylus pen, or the like touches or approaches on the touch sensor pattern portions 21 is detected as an electric signal.

Examples of the image display module include a liquid crystal display device, an organic electro luminescence (EL) device, a cathode-ray tube (CRT) display device, a vacuum fluorescent display (VFD), a plasma display panel. (PDP), a surface-conduction electron-emitter display (SED), a field emission display (FED), an electronic paper, and the like. As the image display module, an image display module is appropriately used based on the intended use, but a liquid crystal display device, an organic EL display, or the like is preferably used in order to make the touch panel formed with the image display module and the touch sensor member 11 thin.

EXAMPLES

The present invention will be described in more detail below based on Examples. The materials, amounts, ratios, treatment contents, treatment procedures, and the like illustrated in the following Examples can be appropriately modified as long as Examples do not depart from the gist of the present invention, and the scope of the present invention should not be construed as limited by the following Examples.

In the present example, touch sensor member precursors of Examples 1 to 10 and Comparative Examples 1 to 5 are prepared in the roll form, and the number of discharges generated in the lead wires 22, the number of discharges generated in the conductive wires 32 of the touch sensor pattern portions 21, and a discharge rate of short-circuit failures in the touch sensor member precursor were determined with respect to each of the touch sensor member precursors. The X direction that is an arrangement direction of the plurality of touch sensor pattern portions 21 was set equal to a transport direction $D_F$ of the touch sensor member precursor in a case where the touch sensor member precursor is wound around the winding roll 10, and the Y direction is set equal to the width direction of the substrate 14.

In the present example, a polyethylene terephthalate film (manufactured by FUJIFILM Corporation) having a width Ws of 500 mm, a length of 4000 m, and a thickness of 41 μm was used as the substrate 14 of the touch sensor member precursor.

Figure 15:
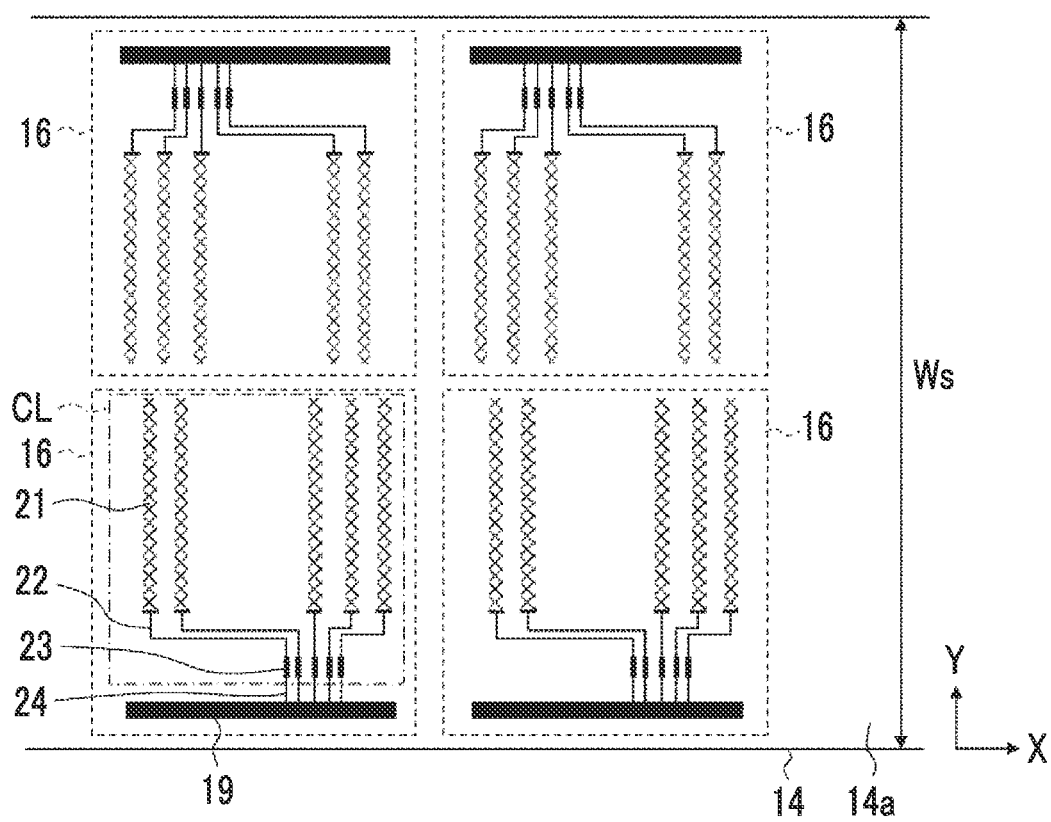
FIG. 15 is a schematic view illustrating an example of the touch sensor member precursor according to Examples of the present invention.

As illustrated in FIG. 15, on the front surface 14a of the substrate 14, a total of four pattern formation areas 16 in which two areas 16 were disposed in the Y direction and other two areas 16 were disposed in the X direction of the substrate 14 are spaced at regular intervals of 800 mm in the X direction, and an exposure mask for producing a conductive pattern in these four pattern formation areas 16 was prepared. Here, each of the conductive patterns is a pattern consisting of the plurality of touch sensor pattern portions 21, the plurality of lead wires 22, the plurality of connection terminals 23, the plurality of connection wirings 24, and the potential difference elimination pattern portion 19.

A touch sensor member precursor was produced by disposing an exposure mask for forming a conductive pattern on the substrate 14, and carrying out so-called photolithography. Next, this touch sensor member precursor was wound around a winding core having an outer diameter of 175 mm to obtain a roll-shaped touch sensor member precursor. All of the above steps were carried out using a roll-to-roll manufacturing apparatus, in the manufacturing of the roll-shaped touch sensor member precursor, a length of 2200 m of the polyethylene terephthalate film out of the length of 4000 m was treated by a manufacturing apparatus.

Next, a method for producing the touch sensor member precursor will be described in detail.

(Method for Producing Touch Sensor Member Precursor)
<Preparation of Silver Halide Emulsion>

The amounts corresponding to 90% of the following liquid 2 and 90% of the following liquid 3 were added to the following liquid 1 kept at a temperature of 38° C. and a potential of hydrogen (pH) of 4.5 at the same time for 20 minutes while stirring to form 0.16 μm of nuclear particles. Subsequently, the following liquids 4 and 5 were added for 8 minutes, and the remaining amounts of 10% of the following liquid 2 and 10% of the following liquid 3 were added for 2 minutes to grow to 0.21 μm. Furthermore, 0.15 g of potassium iodide was added and aged for 5 minutes to complete particle formation.

Liquid 1:

| | |
|---|---|
| Water | 750 ml |
| High molecular weight gelatin (molecular weight; 300,000) | 9 g |
| Low molecular weight gelatin (molecular weight; 15,000) | 4.5 g |
| Sodium chloride | 3 g |
| 1,3-Dimethylimidazolidine-2-thione | 20 mg |
| Sodium benzenethiosulfonate | 10 mg |
| Citric acid | 0.7 g |

Liquid 2:

| | |
|---|---|
| Water | 300 ml |
| Silver nitrate | 150 g |

Liquid 3:

| | |
|---|---|
| Water | 300 ml |
| Sodium chloride | 38 g |
| Potassium bromide | 32 g |
| Potassium hexachloroiridium (III) (0.005% KCl 20% aqueous solution) | 8 ml |
| Ammonium hexachlororodium acid (0.001% NaCl 20% aqueous solution) | 10 ml |

Liquid 4:

| | |
|---|---|
| Water | 100 ml |
| Silver nitrate | 50 g |

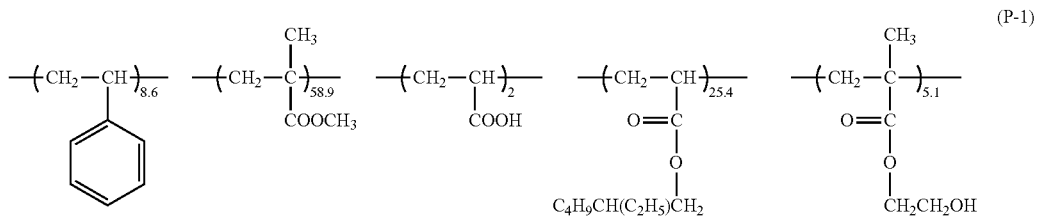

(P-1)

Liquid 5:

| | |
|---|---|
| Water | 100 ml |
| Sodium chloride | 13 g |
| Potassium bromide | 11 g |
| Yellow prussiate of potash | 5 mg |

Thereafter, according to a common procedure, washing with water was carried out by a flocculation method. Specifically, the temperature was lowered to 35° C., 3 liters of distilled water was added, and the pH was lowered using sulfuric acid until the silver halide was sedimented (pH was in the range of 3.6±0.2). Next, about 3 liters of a supernatant solution was removed (first washing with water). After adding another 3 liters of distilled water, sulfuric acid was added until the silver halide was sedimented. 3 liters of the supernatant solution was removed again (second washing with water). The same operation as the second washing with water was further repeated once (third washing with water), and the water washing/desalting step was completed. After washing and desalting, the emulsion was adjusted to pH 6.4 and pAg 7.5, and 3.9 g of a high-molecular-weight gelatin, 10 mg of sodium benzenethiosulfonate, 3 mg of sodium benzenethiosulfinate, 15 mg of sodium thiosulfate, and 10 mg of gold chloride acid were added thereto and chemically sensitized at 55° C. to obtain optimum sensitivity. Furthermore, 100 mg of 1,3,3a,7-tetraazaindene was added as a stabilizer and 100 mg of Proxel (trade name, manufactured by ICI Co., Ltd.) was added as a preservative. The finally obtained emulsion was an emulsion of cubic silver iodochlorobromide particles, which contained 0.08 mol % of silver iodide and silver chlorobromide including 70 mol % of silver chloride and 30 mol % of silver bromide, and had an average particle diameter of 0.15 μm and a variation coefficient of 10%.

<Preparation of Composition for Forming Photosensitive Layer>

$1.2 \times 10^{-4}$ mol/mol-Ag of 1,3,3a,7-tetraazaindene, $1.2 \times 10^{-2}$ mol/mol-Ag of hydroquinone, $3.0 \times 10^{-4}$ mol/mol-Ag of citric acid, 0.90 g/mol-Ag of a sodium salt of 2,4-dichloro-6-hydroxy-1,3,5-triazine, and a trace of a film hardener were added to the emulsion, and the pH of the resultant coating liquid was controlled to 5.6 using citric acid.

A polymer latex containing a dispersant consisting of a polymer represented by (P-1) and a dialkylphenyl PEO sulfate ester (mass ratio of dispersant/polymer is 2.00/100=0.02, concentration of solid contents: 22% by mass) was added to the above coating liquid so as to be polymer/gelatin (mass ratio)=0.2/1, with respect to the contained gelatin. Here, in the silver halide-containing coating liquid, a ratio R1 (polymer/silver halide) of the mass of the polymer to the mass of silver halide was 0.024.

Furthermore, EPOXY RESIN DY 022 (trade name: manufactured by Nagase ChemteX Corporation) was added as a crosslinking agent. The amount of the crosslinking agent added was adjusted so that the amount of the crosslinking agent in the photosensitive layer described later was 0.09 g/m².

A composition for forming a photosensitive layer was prepared as described above. The polymer represented by (P-1) described above was synthesized with reference to JP3305459B and JP3754745B.

<Step of Forming Photosensitive Layer>

A composition for forming an undercoat layer described later was applied to the front surface 14a of the substrate 14 so that the film thickness after drying was 60 nm, and dried at 90° C. for 1 minute to produce a substrate with an undercoat layer. The film thickness of the undercoat layer was measured with an electron microfilm thickness meter manufactured by ANRITSU CORPORATION.

(Composition for Forming Undercoat Layer (Curable Composition))

The following components were mixed to prepare a composition for forming an undercoat layer.

| | |
|---|---|
| Acrylic polymer (AS-5.63A, manufactured by Daicel FineChem Ltd., solid content: 27.5% by mass) | 66.4 parts by mass |
| Carbodiimide-based crosslinking agent (Carbodilite V-02-L2, manufactured by Nisshinbo Holdings, Inc., solid content: 10% by mass) | 16.6 parts by mass |
| Colloidal silica (Snowtex XL, manufactured by Nissan Chemical Industries, Ltd., solid content: 10% by mass diluted with water) | 4.4 parts by mass |
| Slipping agent: Carnauba wax (Cerozol 524, manufactured by CHUKYO YUSHI CO., LTD., solid content: 3% by mass diluted with water) | 27.7 parts by mass |

-continued

| | |
|---|---|
| Surfactant: Anionic surfactant (Rapisol A-90, manufactured by NOF CORPORATION, solid content: 1% by mass aqueous solution) | 23.3 parts by mass |
| Surfactant: Nonionic surfactant (Naro Acty CL95, manufactured by Sanyo Chemical Industries, Ltd., solid content: 1% by mass aqueous solution) | 14.6 parts by mass |
| Distilled water | 847.0 parts by mass |

Next, a first composition-adjusting coating liquid described later, the silver halide-containing coating liquid described above, and a second composition-adjusting coating liquid described later are sequentially applied and simultaneously multi-layered onto the undercoat layer of the substrate with the undercoat layer from the undercoat layer side at a coating liquid flow rate ratio (first composition-adjusting coating liquid/silver halide-containing coating liquid/second composition-adjusting coating liquid) of 25/25/1, to form a silver halide-containing photosensitive layer on the substrate 14. The film thus obtained was designated as a film A.

In the first composition-adjusting coating liquid, the polymer latex and gelatin are mixed at a mixing mass ratio (mass of polymer/mass of gelatin) of 3/1, and furthermore, the first composition-adjusting coating liquid is a composition consisting of a mixture containing a dye that has an optical density of about 1.0 and is decolorized by the alkali of a developer. The concentration of the first composition-adjusting coating liquid was adjusted so that the amount (coating amount) of the polymer in a layer formed of the first composition-adjusting coating liquid was 0.65 g/m². Since the layer formed of the first composition-adjusting coating liquid contains a dye, an anti-halation function functions.

The second composition-adjusting coating liquid is a composition obtained by mixing the above polymer latex, gelatin, and colloidal silica (Snowtex ST-C) at a solid content mixing mass ratio (polymer/gelatin/silica) of 0.5/1/1.5. In the second composition-adjusting coating liquid, the concentration was adjusted so that the amount of gelatin in the layer formed of the second composition-adjusting coating liquid was 0.10 g/m² (the amount of polymer latex is 0.05 g/m²).

In the layer formed of the silver halide-containing coating liquid, the silver amount was 7.4 g/m², the polymer amount was 0.26 and the gelatin amount was 1.02 g/m².

<Step of Exposure Development>

As the exposure mask for forming the conductive pattern, the exposure mask having the same shape of patterns as the plurality of touch sensor pattern portions 21, the plurality of lead wires 22, the plurality of connection terminals 23, the plurality of connection wirings 24, and the potential difference elimination pattern portion 19 according to the embodiment of the present invention illustrated in FIGS. 3 and 5. The exposure mask was disposed on one side of the film A, that is, on a side on which the silver halide-containing photosensitive layer is formed, and exposure was repeated at predetermined pattern intervals with parallel light using a high-pressure mercury lamp as a light source.

After the exposure, the development was carried out using the following developer, and furthermore, development treatment was carried out with a fixer (trade name: N3X-R for CN16X, manufactured by FUJIFILM Corporation). Furthermore, by rinsing with pure water and drying, the substrate 14 having a conductive pattern consisting of fine silver wires on one side and a gelatin layer was obtained. The gelatin layer was formed between the fine silver wires. The obtained film is referred to as a film B.

(Composition of Developer)

The following compounds are contained in. 1 liter (L) of the developer.

| | |
|---|---|
| Hydroquinone | 0.037 mol/L |
| N-methylaminophenol | 0.016 mol/L |
| Sodium metaborate | 0.140 mol/L |
| Sodium hydroxide | 0.360 mol/L |
| Sodium bromide | 0.031 mol/L |
| Potassium disulfite | 0.187 mol/L |

<Gelatin Decomposition Treatment>

The film B was immersed in an aqueous solution of a proteolytic enzyme (Bioprase AL-15FG manufactured by Nagase ChemteX Corporation) (proteolytic enzyme concentration: 0.5% by mass, liquid temperature: 40° C.) for 120 seconds. The film B was taken out from the aqueous solution, immersed in warm water (liquid temperature: 50° C.) for 120 seconds, and washed. The film obtained after the gelatin decomposition treatment is referred to as a film C.

<Low Resistance Treatment>

The above film C was subjected to a calendar treatment at a pressure of 30 kN using a calendar device consisting of a metal roller. In this case, a polyethylene terephthalate (PET) film having a rough surface shape with a line roughness Ra=0.2 μm and Sm=1.9 μm (measured with a shape analysis laser microscope VK-X110 manufactured by KEYENCE CORPORATION (JIS-B-0601-1994)) was conveyed while performing the above treatment so that the rough surface faced the front surface of the film C, and the rough surface shape was transferred and formed on the front surface of the film C.

After the above calendar treatment, the film C passed through a superheated steam tank having a temperature of 150° C. over 120 seconds, and heat treatment was carried out. The film after the heat treatment is referred to as a film D. This film D is the touch sensor member precursor illustrated in FIG. 15, and is a roll-shaped touch sensor member precursor obtained by being wound around the winding core of the manufacturing apparatus.

Next, Examples 1 to 10 and Comparative Examples 1 to 5 will be described.

Example 1

A touch sensor member precursor of Example 1 has the same shape as the touch sensor member precursor 12 illustrated in FIGS. 3 and 5.

Regarding the plurality of touch sensor pattern portions 21, a sensor pattern width L1 in the X direction was set to 4 mm, and a sensor pattern length L2 in the Y direction was set to 170 rum. In addition, each of the touch sensor pattern portions 21 had the diamond-shaped mesh pattern 30 as illustrated in FIG. 4, and the line width Wa of each of the conductive wires 32 constituting the mesh pattern 30 was set to 3 μm, a side length of a diamond shape, that is, the opening width Pa was set to 170 mm, and an acute angle of the diamond shape was set to 60 degrees.

Regarding the plurality of lead wires 22, the lead wire width Wb was set to 60 μm, and the distance Sb between closest lead wires was set to 60 μm. The connection terminal width We was set to 250 μm, the connection terminal length Lc was set to 25 mm, and the distance Sc between closest terminals was set to 250 μm, with respect to the plurality of connection terminals 23. Regarding the plurality of connection wirings 24, the connection wiring width Wd was set to 240 μm, and the connection wiring length Ld was set to 30 mm. Regarding the potential difference elimination pattern portion 19, the potential difference elimination pattern portion width We was set to 15 mm, and the potential difference elimination pattern length Le was set to 300 mm.

Example 2

In a touch sensor member precursor of Example 2, the connection terminal width We of each of the plurality of connection terminals 23 was set to 150 μm, the distance Sc between closest terminals was set to 150 μm, and the connection wiring width Wd of the plurality of connection wirings 24 was set to 140 μm with respect to the touch sensor member precursor of Example 1.

Example 3

In a touch sensor member precursor of Example 3, the connection wiring width Wd of each of the plurality of connection wirings 24 was set to 70 μm with respect to the touch sensor member precursor of Example 1.

Example 4

In a touch sensor member precursor of Example 4, the connection wiring width Wd of each of the plurality of connection wirings 24 was set to 50 μm with respect to the touch sensor member precursor of Example 1.

Example 5

In a touch sensor member precursor of Example 5, the lead wire width Wb of each of the plurality of lead wires 22 was set to 10 μm, the distance Sb between closest lead wires was set to 10 μm, the connection terminal width We of each of the plurality of connection terminals 23 was set to 150 μm, and the distance Sc between closest terminals was set to 150 μm with respect to the touch sensor member precursor of Example 4.

Example 6

A touch sensor member precursor of Example 6 has the plurality of connection wirings 24A illustrated in FIG. 6 instead of the plurality of connection wirings 24 with respect to the touch sensor member precursor of Example 5. Regarding the plurality of connection wirings 24A, the connection wiring width Wd of the cut portion CP was set to 8 μm, the cut portion length L3 was set to 10 mm, the line width W1 of the main portion MP was set to 50 μm, and the main portion length L4 was set to 20 mm.

Example 7

In a touch sensor member precursor of Example 7, the connection wiring width Wd of the cut portion CP of each of the plurality of connection wirings 24A was set to 3 μm with respect to the touch sensor member precursor of Example 6.

Example 8

A touch sensor member precursor of. Example 8 has the potential difference elimination pattern portion 19G illustrated in FIG. 12 instead of the potential difference elimination pattern portion 19 with respect to the touch sensor member precursor of Example 4. Regarding the plurality of sacrifice pattern portions 43 of the potential difference elimination pattern portion 19G, the sacrifice pattern portion width Wf was set to 450 μm, and the number of each of the plurality of branch portions 45 extending from both sides of the trunk portion 44 in the X direction was set to 7. The line width Wg of each of the plurality of trunk portions 44 and the plurality of branch portions 45 in the plurality of sacrifice pattern portions 43 was set to 7.5 μm, and the overlapping width Wh of the overlapping region H of the adjacent sacrifice pattern portions 43 was set to 150 μm. The distance Sg between closest sacrifice pattern portions was set to 7.5 μm. The distance Sc between closest terminals was set to 150 μm.

Example 9

A touch sensor member precursor of Example 9 has the potential difference elimination pattern portion 19E that causes a short-circuit between the plurality of connection wirings 24 in 50 pattern formation areas 16 adjacent to one another in the X direction as illustrated in FIG. 10 instead of the potential difference elimination pattern portion 19 with respect to the touch sensor member precursor of Example 4. The potential difference elimination pattern length Le of the potential difference elimination pattern portion 19E was set to 20 mm.

Example 10

A touch sensor member precursor of Example 10 has the potential difference elimination pattern portion 19E that causes a short-circuit between the plurality of connection wirings 24 in 50 pattern formation areas 16 adjacent to one another in the X direction as illustrated in FIG. 10 instead of the potential difference elimination pattern portion 19 with respect to the touch sensor member precursor of Example 6. The potential difference elimination pattern length Le of the potential difference elimination pattern portion 19E was set to 20 mm.

Comparative Example 1

In a touch sensor member precursor of Comparative Example 1, the connection wiring width Wd of each of the plurality of connection wirings 24 was set to 250 μm with respect to the touch sensor member precursor of Example 1.

Comparative Example 2

In a touch sensor member precursor of Comparative Example 2, the connection wiring width Wd of each of the plurality of connection wirings 24 was set to 300 μm with respect to the touch sensor member precursor of Example 1.

Comparative Example 3

In a touch sensor member precursor of Comparative Example 3, the connection wiring width Wd of each of the plurality of connection wirings 24 was set to 240 μm with respect to the touch sensor member precursor of Example 2.

Comparative Example 4

A touch sensor member precursor of Comparative Example 4 does not include the plurality of connection wirings 24 and the potential difference elimination pattern portion 19 with respect to the touch sensor member precursor of Example 1.

Comparative Example 5

A touch sensor member precursor of Comparative Example 5 does not include the plurality of connection wirings 24 and the potential difference elimination pattern portion 19 with respect to the touch sensor member precursor of Example 5 and Example 6.

(Evaluation of Number of Sparks in Electrode Part)

A black resin plate was prepared, and each of the touch sensor member precursors of Examples 1 to 10 and Comparative Examples 1 to 5 was disposed on the black resin plate so that the back surface on which the conductive pattern was not formed was in contact with the black resin plate. Furthermore, the plurality of touch sensor pattern portions 21 was irradiated with the light of light emitting diodes (LEDs) to record portions that look darker than the surrounding portion, and the vicinity of the recorded portion was observed with a microscope (Keyence VHX 5000, a magnification of 200 to 1000, and simultaneous ON of reflected light and transmitted light). In this case, the portions where the fragments of the conductive wires 32 of the touch sensor pattern portions 21 were confirmed were recognized as the damaged portions due to the electric discharge. Such an inspection was performed in. 100 pattern formation areas 16, and an average value of the number of recognized damaged portions per pattern formation area 16 was defined as "the number of sparks in the electrode part".

(Evaluation of Number of Sparks Between Lead Wires)

The touch sensor members are manufactured by cutting out the touch sensor member precursors of Examples 1 to 10 and Comparative Examples 1 to 5 in a sheet shape along a cutting line CL as illustrated in FIG. 15, and the plurality of lead wires 22 of the manufactured touch sensor members were observed with a microscope (Keyence 5000, magnification of 200 to 1000, and simultaneous ON of reflected light and transmitted light). In this case, the lead wires 22 has damaged parts and recognizes a radial shadow on the substrate 14 in the vicinity of the damaged parts as the damaged parts due to electric discharge. By such an observation method, all of 70 lead wires 22 are observed with respect to one touch sensor member. The observation is made for five touch sensor members in the same manner, and an average value of the number of damaged parts recognized per one touch sensor member is defined as the "number of sparks between lead wires".

(Evaluation of Short-Circuit Failure Rate)

In the touch sensor members manufactured from the touch sensor member precursors of Examples 1 to 10 and Comparative Examples 1 to 5, the insulation resistance between the connection terminals 23 adjacent to each other is sequentially measured by a conduction inspecting terminal such as a so-called circuit tester (circuit tester) being abutted on the connection terminals 23 adjacent to each other among the plurality of connection terminals 23. The connection terminals 23 where the measured insulation resistance is less than 20 M ohms is observed with a microscope (Keyence VI-IX 5000, a magnification of 200 to 1000, and simultaneous ON of reflected light and transmitted light), it is determined that the touch sensor member to be inspected has a short-circuit failure in a case where even one fragment of each of the connection wirings 24 that contacts both of the connection terminals 23 adjacent to each other was observed. Such an inspection is carried out on 100 touch sensor members, and the short-circuit failure rate is calculated by (the number of touch sensor members in which short-circuit failure occurs)/100(%).

As described above, the results of the evaluation of the number of sparks in the electrode part, the evaluation of the number of sparks between lead wires, and the evaluation of the short-circuit failure rate are illustrated in Table 1. Here, the "short-circuit pattern" in the item of the potential difference elimination pattern in Table 1 has the same shape as the potential difference elimination pattern portion 19 illustrated in FIGS. 3, 5, and 6, and causes a short-circuit between the plurality of connection wirings 24 or 24a with each other. The "non-short-circuit pattern" has the same shape as the potential difference elimination pattern portion 19G illustrated in FIG. 12, and does not short-circuit the plurality of connection wirings 24 with each other. The "area short-circuit pattern" has the same shape as the potential difference elimination pattern portion 19E illustrated in FIG. 10, and causes a short-circuit between the plurality of connection wirings 24 in the plurality of pattern formation areas 16 with each other.

TABLE 1

| | Line width Wa [μm] of conductive wire | Connection wiring width Wd [μm] | Distance Sb between closest lead wires [μm] | Distance Sc between closest terminals [μm] | Potential difference elimination pattern | Number of sparks between lead wires | Number of sparks in electrode part | Short-circuit failure rate |
|---|---|---|---|---|---|---|---|---|
| Example 1 | 3 | 240 | 60 | 250 | Short-circuit pattern | 0 | 0.1 | 3% |
| Example 2 | 3 | 140 | 60 | 150 | Short-circuit pattern | 0 | 0.09 | 3% |
| Example 3 | 3 | 70 | 60 | 250 | Short-circuit pattern | 0 | 0.11 | 1% |
| Example 4 | 3 | 50 | 60 | 250 | Short-circuit pattern | 0 | 0.08 | 0% |
| Example 5 | 3 | 50 | 10 | 150 | Short-circuit pattern | 0 | 0.08 | 1% |
| Example 6 | 3 | 8 | 10 | 150 | Short- circuit pattern | 0 | 0.09 | 0% |
| Example 7 | 3 | 3 | 10 | 150 | Short-circuit pattern | 0 | 0.11 | 0% |
| Example 8 | 3 | 50 | 60 | 150 | Short-circuit pattern | 5 | 0.16 | 0% |
| Example 9 | 3 | 50 | 60 | 250 | Area short-circuit pattern | 0 | 0 | 0% |

TABLE 1-continued

| | Line width Wa [μm] of conductive wire | Connection wiring width Wd [μm] | Distance Sb between closest lead wires [μm] | Distance Sc between closest terminals [μm] | Potential difference elimination pattern | Number of sparks between lead wires | Number of sparks in electrode part | Short-circuit failure rate |
|---|---|---|---|---|---|---|---|---|
| Example 10 | 3 | 8 | 10 | 150 | Area short-circuit pattern | 0 | 0 | 0% |
| Comparative Example 1 | 3 | 250 | 60 | 250 | Short-circuit pattern | 0 | 0.1 | 6% |
| Comparative Example 2 | 3 | 300 | 60 | 250 | Short-circuit pattern | 0 | 0.08 | 9% |
| Comparative Example 3 | 3 | 240 | 60 | 150 | Short-circuit pattern | 0 | 0.1 | 12% |
| Comparative Example 4 | 3 | Not include connection wiring | 60 | 250 | Not include potential difference elimination pattern portion | 16 | 0.33 | 0% |
| Comparative Example 5 | 3 | Not include connection wiring | 10 | 150 | Not include potential difference elimination pattern portion | 98 | 0.37 | 0% |

As illustrated in Table 1, in Examples 1 to 10 in which the connection wiring width Wd was narrower than the distance Sc between closest terminals, the number of sparks between lead wires was 5 or less, the number of sparks in the electrode part was 0.16 or less, and the short-circuit failure rate was 3% or less. In particular, in Examples 4, 6, and 7 in which the potential difference elimination pattern is the short-circuit pattern and the connection wiring width Wd is narrower than the distance Sb between closest lead wires, the number of sparks between lead wires was 0, the number of sparks in the electrode part was 0.11 or less, and the short-circuit failure rate was 0%. Furthermore, in Examples 9 and 10 in which the potential difference elimination pattern was the area short-circuit pattern, both the number of sparks between lead wires and the number of sparks in the electrode part were 0, and the short-circuit failure rate was 0%.

As described above, it can be seen that in Examples 1 to 10, both suppressing the discharge phenomenon occurring between the plurality of lead wires 22 and between the plurality of touch sensor pattern portions 21 and suppressing the short-circuit failure can be achieved at the same time.

In Comparative Examples 1 to 3, although the connection wiring width Wd was equal to or greater than the distance Sc between closest terminals, and the number of sparks between lead wires was 0, the short-circuit failure rate was 6% or more. As a result, it is considered that in a case where the connection wiring width Wd is equal to or greater than the distance Sc between closest terminals, the fragments of the connection wirings 24 generated in a case where the plurality of connection wirings 24 tend to be brought into contact with the lead wires 22 adjacent to each other and the connection terminals 23 adjacent to each other, thereby increasing the short-circuit failure rate.

In Comparative Examples 4 and 5, since the plurality of connection wirings 24 are not provided, the short-circuit failure rate is 0%. However, since the potential difference elimination pattern portion 19 is not provided, a potential difference is likely to occur between the plurality of lead wires 22, and the number of sparks between lead wires was 16 and 98.

As described above, the plurality of connection wirings 24 or 24a and the potential difference elimination pattern portions 19, 19E, 19G, and the like are provided on the touch sensor member precursor, and the relationship of (connection wiling width Wd)<(distance Sc between closest terminals) is satisfied. As a result, both suppressing the discharge phenomenon occurring between the plurality of lead wires 22 and the plurality of touch sensor pattern portions 21 and suppressing a short-circuit failure are achieved, so that the relationship of (connection wiring width Wd)<(distance Sb between closest lead wires)<(distance Sc between closest terminals) are satisfied. Thereby, it can be seen that the discharge phenomenon and the short-circuit failure between the plurality of lead wires 22 and the plurality of touch sensor pattern portions 21 are further suppressed.

In Examples 1 to 10, although the plurality of touch sensor pattern portions 21, the plurality of lead wires 22, the plurality of connection terminals 23, the plurality of connection wirings 24 or 24a, and the potential difference elimination pattern portions 19, 19E, and 19G are disposed only on one side of the substrate 14, the evaluation of the number of sparks in the electrode part and the evaluation of the number of sparks between lead wires, and the evaluation of the short-circuit failure rate were carried out with respect to each of both sides of the substrate 14 on which the plurality of touch sensor pattern portions 21, the plurality of lead wires 22, the plurality of connection terminals 23, the plurality of connection wirings 24 or 24a, and the potential difference elimination pattern portions 19, 19E, and 19G were disposed. Even though the plurality of touch sensor pattern portions 21, the plurality of lead wires 22, the plurality of connection terminals 23, the plurality of connection wirings 24 or 24a, and the potential difference elimination pattern portions 19, 19E, and 19G were disposed on both sides of the substrate 14, the excellent effects similar to Example 1 to 10 was obtained.

The present invention is basically configured as described above. Although the touch sensor member precursor of the present invention and the method for manufacturing a touch sensor member have been described in detail above, the present invention is not limited to the above-mentioned embodiments, and various improvements or modifications may also be made without departing from the gist of the present invention.

EXPLANATION OF REFERENCES

10: Winding roll
11, 11D: Touch sensor member 12, 12A, 12B, 12C, 12D, 12E, 12F, 12G: Touch sensor member precursor
14: Substrate
14a: Front surface
14b: Back surface
16: Pattern formation area
17: Gap portion
19, 19B, 19C, 19E, 19G: Potential difference elimination pattern portion
21, 21H: Touch sensor pattern portion
22: Lead wire
23: Connection terminal
24, 24A: Connection wiring
30, 30H: Mesh pattern
32, 36: Conductive wire
33, 33H: Opening portion
34: Base
35: Hexagonal-shaped portion
37A: First touch sensor pattern portion
37B: Second touch sensor pattern portion
38A: First lead wire
38B: Second lead wire
39A: First connection terminal
39B: Second connection terminal
40A: First connection wiring
40B: Second connection wiring
41A: First potential difference elimination pattern portion
41B: Second potential difference elimination pattern portion
42: Third potential difference elimination pattern portion
43: Sacrifice pattern portion
44: Trunk portion
45: Branch portion
46: Disconnection portion
60: Conductive member
62: Binder
64: Metal part
CL: Cutting line
CP: Cut portion
$D_F$: Transport direction
H: Overlapping region
L1: Sensor pattern width
L2: Sensor pattern length
L3: Cut portion length
L4: Main portion length
Lc: Connection terminal length
Ld: Connection wiring Length.
MP: Main portion
Pa: Opening width
Pg: Interval
Sb: Distance between closest lead wires
Sc: Distance between closest terminals
Sg: Distance between closest sacrifice pattern portions
W1, Wa, Wg: Wire width.
Wb: Lead wire width
Wc: Connection terminal width
Wd: Connection wiring width
We: Potential difference elimination pattern portion width
Wf: Sacrifice pattern portion width
Wh: Overlapping width.

What is claimed is:

1. A touch sensor member precursor comprising:
a substrate;
a plurality of touch sensor pattern portions disposed on at least one surface of the substrate;
a plurality of lead wires led out from the plurality of touch sensor pattern portions;
a plurality of connection terminals connected to the plurality of lead wires;
a plurality of connection wirings connected to the plurality of connection terminals; and
a potential difference elimination pattern portion connected to the plurality of connection wirings,
wherein the plurality of touch sensor pattern portions, the plurality of lead wires, the plurality of connection terminals, the plurality of connection wirings, and the potential difference elimination pattern portion consist of conductive members disposed on the same surface of the substrate,
each of the plurality of connection wirings includes a cut portion having a connection wiring width Wd,
the connection terminals adjacent to each other among the plurality of connection terminals are spaced from each other by a distance Sc between closest terminals at positions closest to each other, and
a relationship of Wd<Sc is satisfied.

2. The touch sensor member precursor according to claim 1, wherein the distance Sc between closest terminals of the plurality of connection terminals is 150 μm or greater and 250 μm or smaller.

3. The touch sensor member precursor according to claim 2, wherein the connection wiring width Wd of the cut portion of each of the plurality of connection wirings satisfies a relationship of 3 μm≤Wd<250 μm.

4. The touch sensor member precursor according to claim 3, wherein the connection wiring width Wd of the cut portion of each of the plurality of connection wirings satisfies a relationship of 3 μm≤Wd<150 μm.

5. The touch sensor member precursor according to claim 4, wherein the lead wires adjacent to each other among the plurality of lead wires are spaced from each other by a distance Sb between closest lead wires at positions closest to each other, and a relationship of Wd<Sb<Sc is satisfied.

6. The touch sensor member precursor according to claim 3, wherein
the lead wires adjacent to each other among the plurality of lead wires are spaced from each other by a distance Sb between closest lead Wires at positions closest to each other, and
a relationship of Wd<Sb<Sc is satisfied.

7. The touch sensor member precursor according to claim 2, wherein
the lead wires adjacent to each other among the plurality of lead wires are spaced from each other by a distance Sb between closest lead wires at positions closest to each other, and
a relationship of Wd<Sb<Sc is satisfied.

8. The touch sensor member precursor according to claim 7, wherein the distance Sb between closest lead wires of the plurality of lead wires is 10 μm or greater and 60 μm or smaller.

9. The touch sensor member precursor according to claim 1, wherein
the lead wires adjacent to each other among the plurality of lead wires are spaced from each other by a distance Sb between closest lead wires at positions closest to each other, and
a relationship of Wd<Sb<Sc is satisfied.

10. The touch sensor member precursor according to claim 9, wherein the distance Sb between closest lead wires of the plurality of lead wires is 10 μm or greater and 60 μm or smaller.

11. The touch sensor member precursor according to claim 10, wherein the connection wiring width Wd of the cut portion of each of the plurality of connection wirings satisfies a relationship of 3 μm≤Wd<60 μm.

12. The touch sensor member precursor according to claim 11, wherein the connection wiring width Wd of the cut portion of each of the plurality of connection wirings satisfies a relationship of 3 μm≤Wd<10 μm.

13. The touch sensor member precursor according to claim 9, wherein the potential difference elimination pattern portion consists of a plurality of sacrifice pattern portions that are connected to the plurality of connection wirings, and are disposed to be electrically separated from each other, in which a distance Sg between closest sacrifice pattern portions at positions closest to each other satisfies a relationship of 0<Sg<Sb with respect to the distance Sb between closest lead wires.

14. The touch sensor member precursor according to claim 13, wherein each of the conductive members contains silver as the metal material.

15. The touch sensor member precursor according to claim 1, wherein the potential difference elimination pattern portion causes an electrical short-circuit between the plurality of connection wirings.

16. The touch sensor member precursor according to claim 15, wherein
 a plurality of pattern formation areas are formed on at least one surface of the substrate, and
 the plurality of touch sensor pattern portions, the plurality of lead wires, the plurality of connection terminals, and the plurality of connection wirings are disposed on each of the pattern formation areas.

17. The touch sensor member precursor according to claim 16, wherein the potential difference elimination pattern portion causes an electrical short-circuit between the plurality of connection wirings disposed in the plurality of pattern formation areas different from each other among the plurality of pattern formation areas.

18. The touch sensor member precursor according to claim 1, wherein the plurality of touch sensor pattern portions, the plurality of lead wires, the plurality of connection terminals, the plurality of connection wirings, and the potential difference elimination pattern portion are disposed on both surfaces of the substrate.

19. The touch sensor member precursor according to claim 1, wherein each of the conductive members contains a metal material.

20. A method for manufacturing a touch sensor member comprising cutting the cut portion of each of the plurality of connection wirings of the touch sensor member precursor according to claim 1.

* * * * *